United States Patent [19]

Saegusa

[11] Patent Number: 4,754,299
[45] Date of Patent: Jun. 28, 1988

[54] PHOTOMETRIC METHOD AND APPARATUS FOR CAMERAS

[75] Inventor: Takashi Saegusa, Kawasaki, Japan

[73] Assignee: Nippon Kogaku K. K., Tokyo, Japan

[21] Appl. No.: 904,493

[22] Filed: Sep. 8, 1986

Related U.S. Application Data

[60] Division of Ser. No. 818,912, Jan. 15, 1986, Pat. No. 4,636,054, which is a continuation of Ser. No. 635,844, Jul. 30, 1984, abandoned.

[30] Foreign Application Priority Data

Aug. 2, 1983 [JP] Japan .................................. 58-141274

[51] Int. Cl.$^4$ ............................................. G03B 7/097
[52] U.S. Cl. .................................................... 354/443
[58] Field of Search ................................ 354/435–443, 354/445, 456–464, 286, 289.12, 429, 431, 432, 453, 455

[56] References Cited

U.S. PATENT DOCUMENTS

| | | | |
|---|---|---|---|
| 4,306,787 | 12/1981 | Fukuhara et al. | 354/432 |
| 4,329,040 | 5/1982 | Fukino et al. | 354/286 |
| 4,352,548 | 10/1982 | Toyoda | 354/443 X |
| 4,372,663 | 2/1983 | Oshima | 354/286 |
| 4,391,500 | 7/1983 | Tsunekawa | 354/433 |
| 4,477,164 | 10/1984 | Nakai et al. | 354/286 |
| 4,548,488 | 10/1985 | Honda et al. | 354/286 X |

*Primary Examiner*—W. B. Perkey
*Attorney, Agent, or Firm*—Shapiro and Shapiro

[57] ABSTRACT

In a camera a field to be photographed is divided into a plurality of metering sections which produce a plurality of metering outputs, respectively. The metering outputs are processed to produce a value corresponding to a desired proper brightness value in order to control exposure in the camera. The type of lens mounted on the camera body is discriminated, and the information thus obtained is used for changing the photometry processing. A focal length detector produces a focal length signal which changes with the focal length of the phototaking lens. A teleconverter detector detects that a conversion lens is mounted on the camera body and produces a detection signal. Photometry processing is placed in a high speed mode in response to the detection signal, irrespective of the focal length of the phototaking lens mounted on the camera body.

4 Claims, 30 Drawing Sheets

FIG. 8C
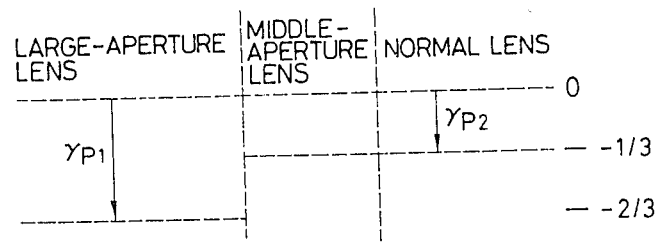
FIG. 9A
FIG. 9B
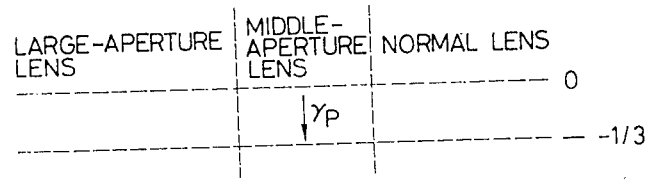

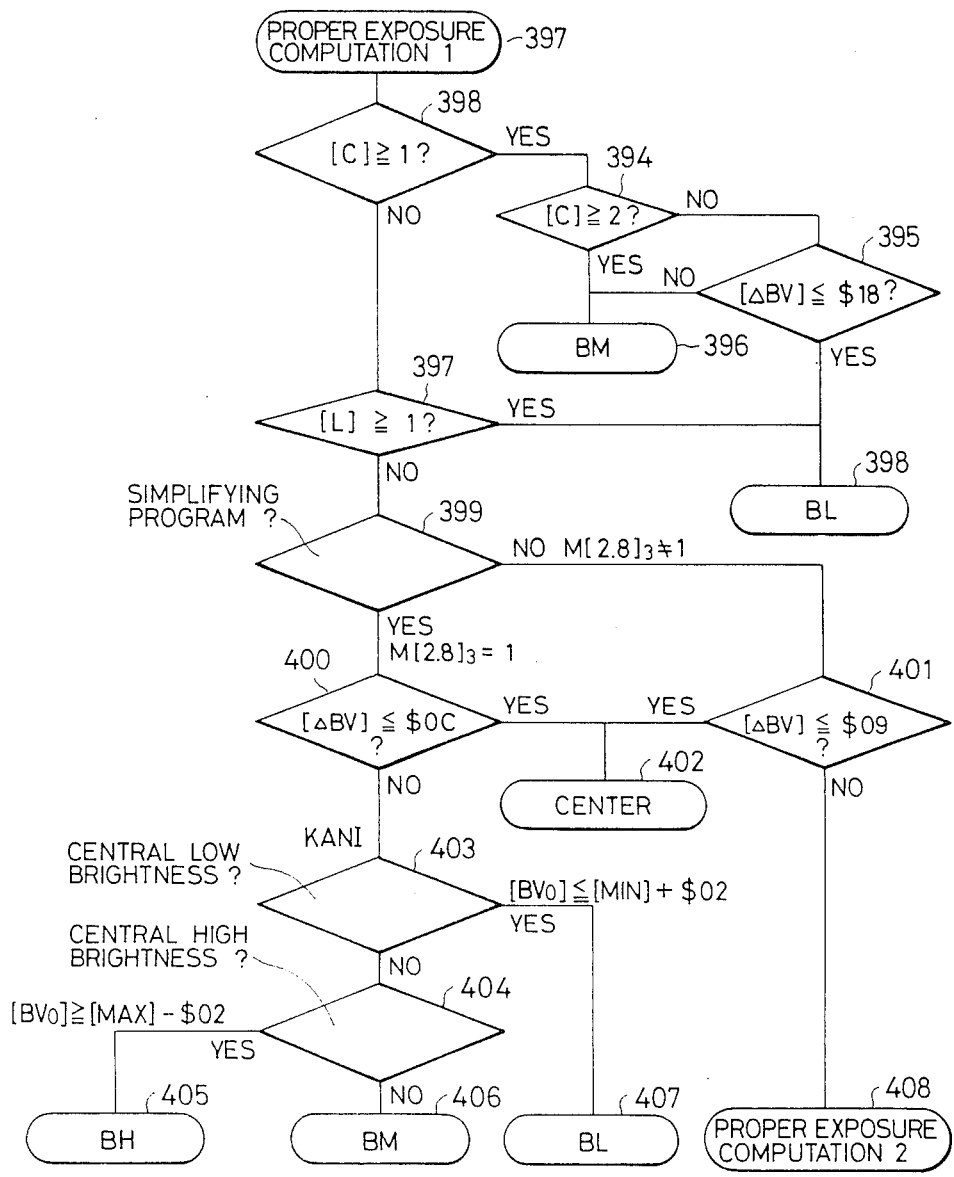

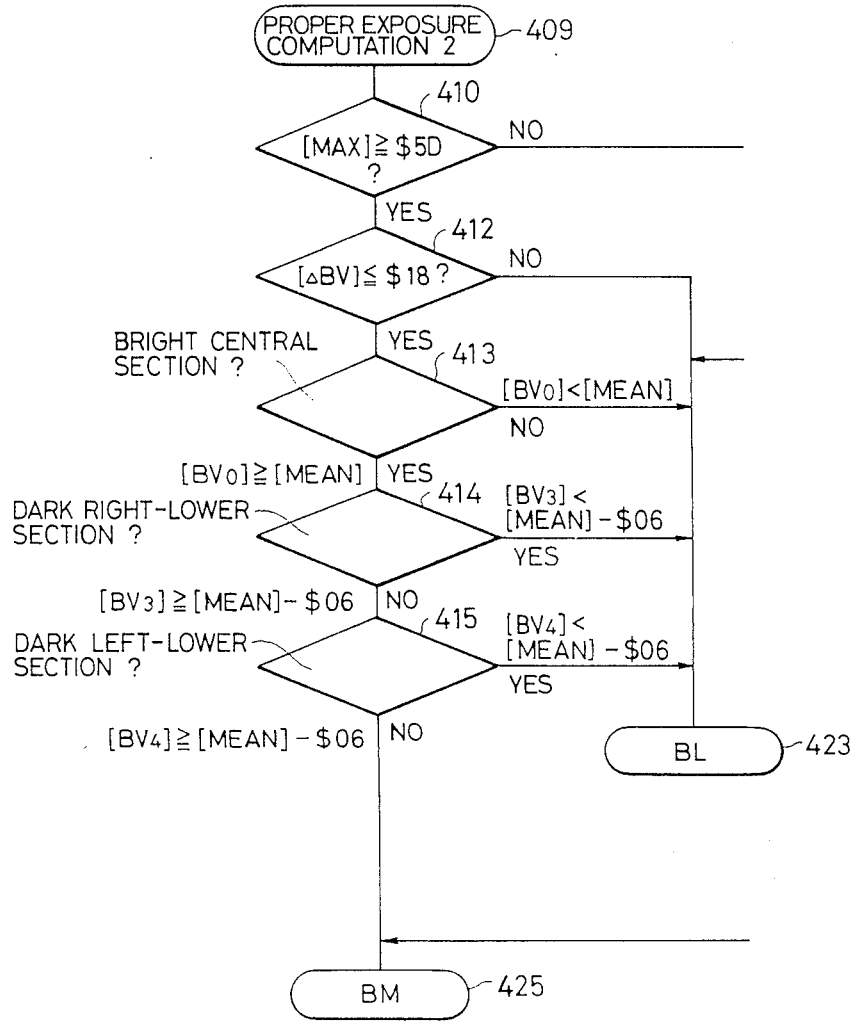

PHOTOMETRIC METHOD AND APPARATUS FOR CAMERAS

This is a divisional application of U.S. Ser. No. 818,912 filed Jan. 15, 1986, now U.S. Pat. No. 4,636,054, which is a continuation application of U.S. Ser. No. 635,844 filed July 30, 1984 (now abandoned).

BACKGROUND OF THE INVENTION

1. Field of the Invention

The present invention relates to a photometric method and apparatus for cameras, capable of dividing a field to be photographed into a plurality of regions which are in turn metered in a photometric manner with the resulting outputs being used to operate a proper exposure on the entire field.

2. Description of the Prior Art

Commercially available cameras are of such a type as controlled only by a single photometric output. Thus, these cameras are subject to a certain light such that a proper exposure will be hard to obtain under a specific source of light such as rear light, spot-like light or others. To overcome such a problem, various attempts have been made in which a field to be photographed is divided into a plurality of regions which are in turn metered in a photometric manner. Applicant has proposed several attempts in U.S. Pat. Nos. 4,412,730 and 4,306,787. Particularly, the latter provides a practical process in which marginal, photometric outputs are compensated by signals from a lens to eliminate effects such as Vignetting and others such that a proper exposure can positively be determined. However, one must consider the properties of various different lenses which are actually utilized when the above process is carried out.

Compensation for marginal amount of light depends on the property of a lens used. Amount to be compensated in the telephoto lens is different from that in the wide-angle lens in the order of one step. If an exposure is computed without consideration of such a difference, the result would be erroneous.

Furthermore, when photometry processing is controlled in accordance with detected focal length of a phototaking lens mounted on the camera body, a problem may arise in determining the appropriate shutter speed program if a teleconversion lens is used together with the phototaking lens.

SUMMARY OF THE INVENTION

In accordance with the present invention, when the mounting of a conversion lens on the camera body is detected, an exposure control means is placed in a predetermined state (e.g., high shutter speed program) irrespective of the focal length of the phototaking lens mounted on the camera body.

BRIEF DESCRIPTION OF THE DRAWINGS

FIG. 8C illustrates the compensation of photometric outputs in the marginal section at an opening of the stop;

FIG. 9A illustrates the basic compensation of photometric outputs in the marginal section which eliminates the basic compensation of photometric outputs in the central section;

FIG. 9B illustrates the compensation of photometric outputs in the marginal section at the opening of the stop which eliminates the compensation of the central section at the opening of the stop;

FIGS. 30–33, 33A, 33B, and 34 are flow charts of a portion of the multi-metering operation subroutine;

DETAILED DESCRIPTION OF THE PREFERRED EMBODIMENTS

Figure 1A:
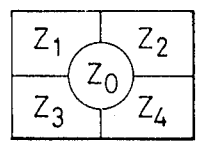
FIGS. 1A and 1B illustrate the division of a field to be photographed in a photometric manner.
Figure 1B:
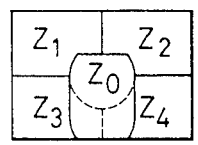

FIGS. 1A shows the division of a field to be photographed in a multi-metering apparatus relating to the present invention. In FIG. 1A, the field to be photographed is divided into a central section and four margin sections surrounding the central section. FIG. 1B shows a modification of the division shown in FIG. 1A, in which the sensitivity of the central section extends to the lower edge of the field to be photographed. Although there are various other dividing manners, this five-section dividing manner is most preferred to balance the complication of the circuit relative to the advantage of the multi-metering process, as described in U.S. Pat. No. 4,274,721.

For convenience, the central section is referred to $Z_0$ and the margin sections are referred to $Z_1$ (left and upper), $Z_2$ (right and upper), $Z_3$ (left and lower) and $Z_4$ (right and lower), respectively.

Figure 2:
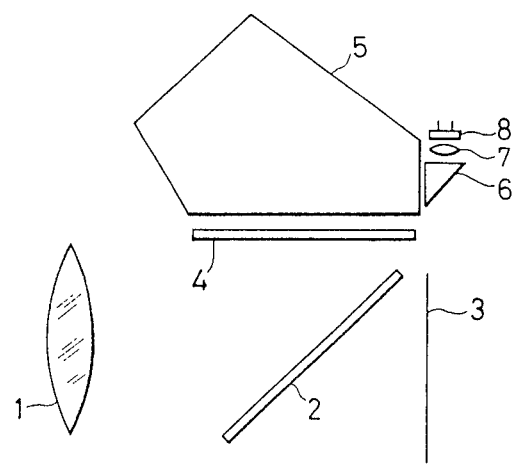
FIG. 2 is a schematic view of a photometric system.

FIG. 2 shows a photometry optical system in a single-lens reflex camera relating to the present invention. The photometry optical system includes a photographic lens 1, a quick-return mirror 2, a shutter (not shown) which is located forwardly of the surface of a film 3, a finder screen 4 and a pentagonal prism 5. Light leaving the prism 5 is inducted to an operator's eye through an eyepiece (not shown) such that the field to be photographed can be observed by the operator. There are a triangle prism 6, a condenser lens 7 and a silicon photodiode (SPD) 8 by a set in each of the opposite sides of the eyepiece (not shown).

Figure 3:
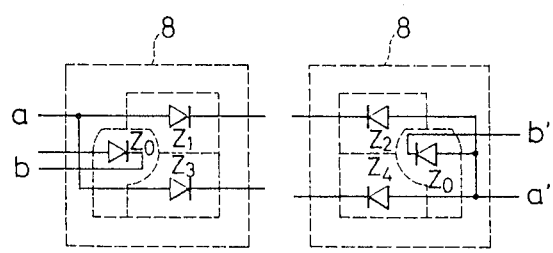
FIG. 3 illustrates SPD patterns.

FIG. 3 shows a pattern of the SPD used to divide a field to be photographed into five sections as shown in FIG. 1B. The reference letters $Z_0$ through $Z_4$ correspond to those shown in FIG. 1B. The central section $Z_0$ connects the right and left SPD' parallel to each other. Namely, terminals a and a' are connected to terminals b and b', respectively.

Figure 4:
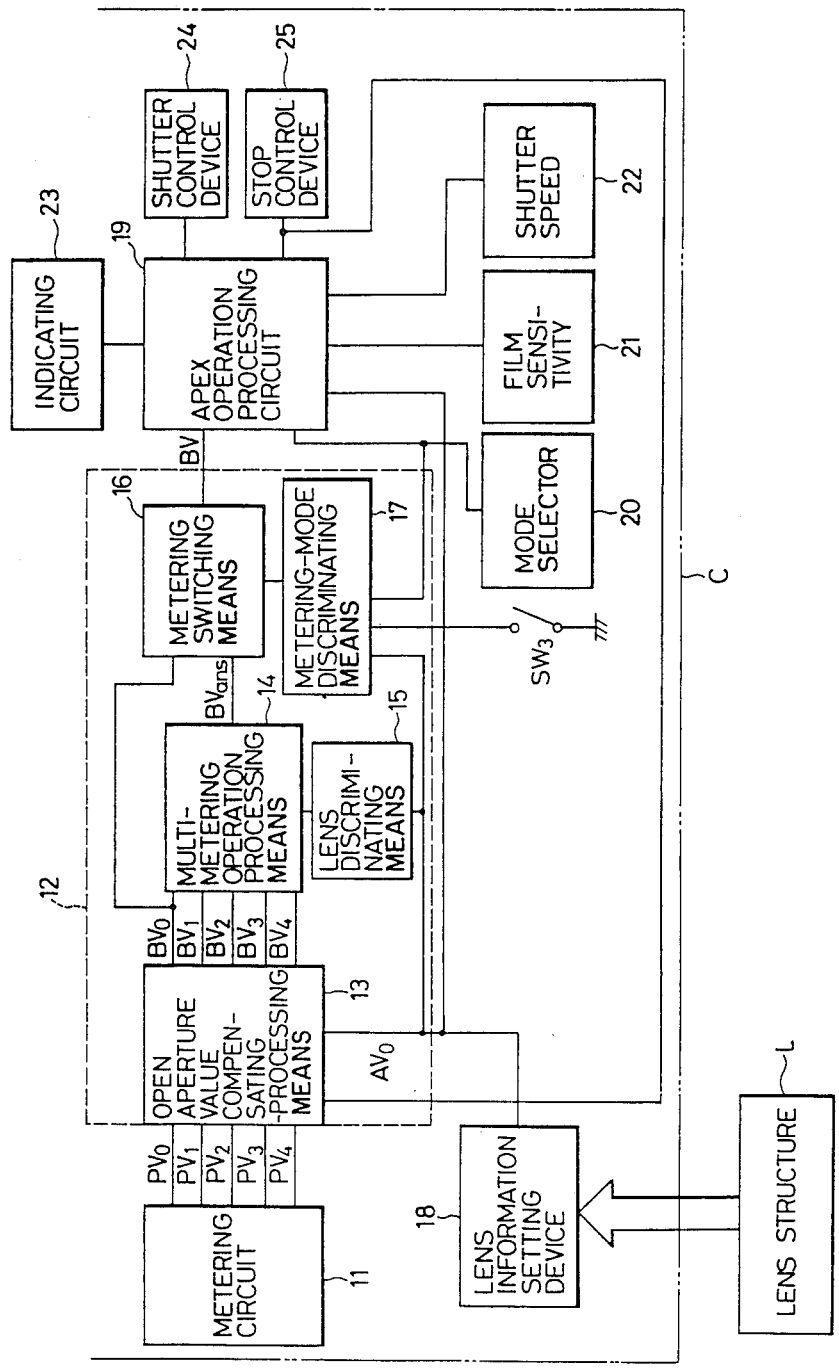
FIG. 4 is a block diagram showing one function of an embodiment of the present invention.

FIG. 4 is a block diagram indicating one function of an embodiment of the present invention which comprises a camera C and a lens structure L. The camera C includes a photometric circuit 11, a multi-metering operation device 12, an apex operation processing circuit 19, a mode selector dial 20, a lens information setting device 18, a film sensitivity setting device 21, a shutter speed setting device 22, an indicating circuit 23, a shutter control device 24 and a stop control device 25. The photometric circuit 11 is adapted to provide five photometric outputs $PV_0$–$PV_4$ by logarithmically compressing a plurality of photo-currents from the SPD 8 (FIG. 1).

The multi-metering operation processing device 12 includes an aperture value compensation processing means 13 is adapted to eliminate various effects such as Vignetting and others to the outputs $PV_0$–$PV_4$ from the photometry circuit 11, which correspond to the respective field sections $Z_0$–$Z_4$. The stop opening conpensating circuit 13 adds an aperture value $AV_0$ to the outputs $PV_0$–$PV_4$ to provide a converted brightness value BV in accordance with various lens information generated from the lens information setting device 18.

The multi-metering operation processing means 14 is adapted to provide a proper brightness value $BV_{ans}$ from a plurality of brightness values $BV_0$–$BV_4$, which correspond to the respective field sections $Z_0$–$Z_4$, in accordance with a given operation processing.

The multi-metering operation processing device 12 also includes a lens discriminating means 15 which is adapted to provide a signal for changing the contents to be processed in the multi-metering operation processing means 14 in accordance with the lens information from the lens information setting device 18 based on the lens information from the lens structure L.

The multi-metering operation processing device 12 further includes a metering switching circuit 16 which is adapted to select one of the central brightness value $BV_0$ (corresponding to the field section $Z_0$) and the output $BV_{ans}$ from the multi-metering operation processing means 14 in accordance with a signal from a metering-mode discriminating means 17. The selected value is supplied to the apex operation processing circuit 19 as a brightness value BV. A central concentration metering switching circuit $SW_3$ is provided such that it is turned on when the central field section is concentrically metered. This switch provides ON and OFF signals which are supplied to the input of the metering-mode discriminating means 17.

The mode selector dial 20 is adapted to change exposure control modes and utilized to select one of Z5 program control mode (P-mode), shutter speed preferential mode (S-mode), aperture preferential mode (A-mode) and manual mode (M-mode).

Figure 5:
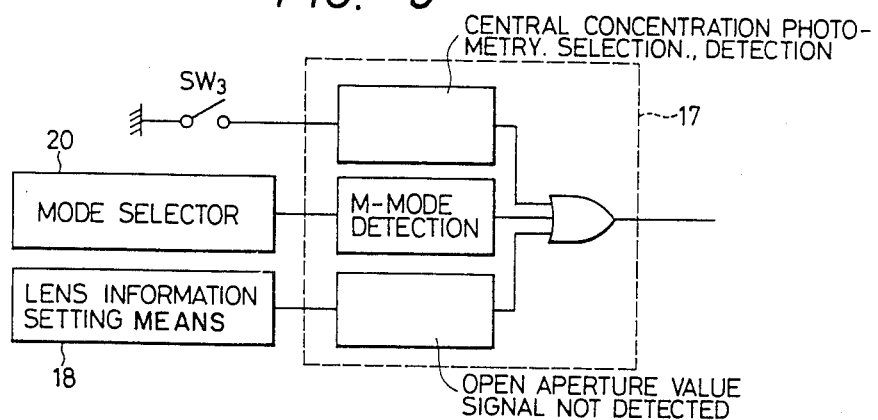
FIG. 5 is a block diagram of the metering-mode discriminating circuit 17 shown in FIG. 4.

As shown in FIG. 5, the metering-mode discriminating means 17 is adapted to cause the metering switching means 16 to select the brightness value $BV_0$ on the central field section;

(i) when the central concentration metering switching switch SW is turned on by selecting the central concentration metering mode;

(ii) when the mode selector dial 20 is set at the M-mode; or (iii) when it is impossible to detect an aperture value signal from the lens information in the lens information setting device 18.

The apex operation processing circuit 19 takes exposure control mode information, film sensitivity information, shutter speed information and lens information from the mode selector dial 20, the film sensitivity setting device 21, the shutter speed setting device 22 and the lens information setting device 18, respectively. In accordance with the taken information, the circuit 19 carries out an apex operation to provide an indication signal which is in turn supplied to the indicating circuit 23. The processing circuit 19 also controls the exposure by controlling a shutter control device 24 and stop control device 25 in accordance with the selected mode and in synchronism with a release. The transmission of the signal from the apex operation processing circuit 19 through the stop control device 25 to the aperture value compensation processing circuit 13 is effected because the stop is preferentially controlled to its opening side at the shutter speed preferential mode or program mode even if the lens is pre-set at its minimum stop value.

Figure 6:
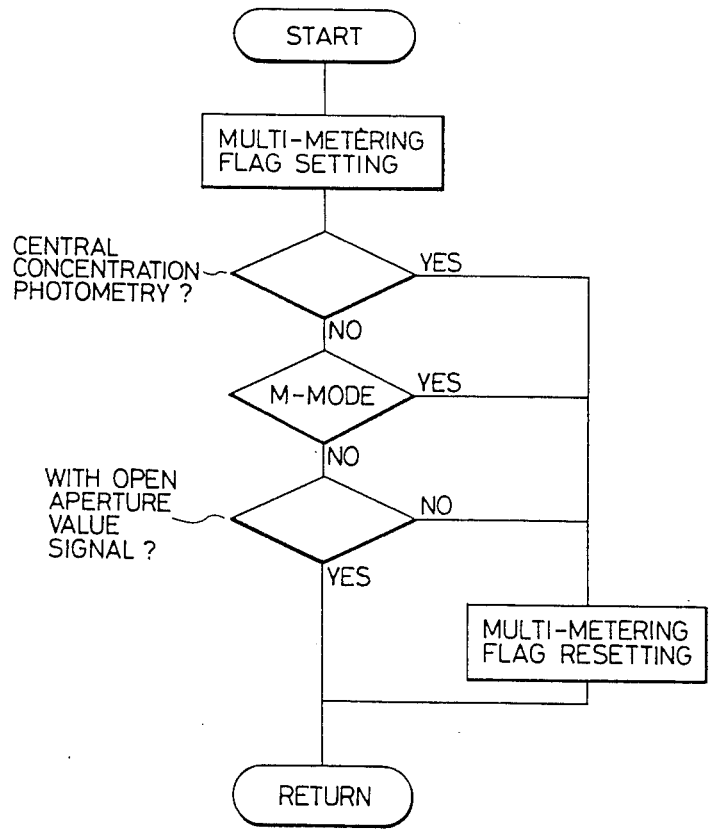
FIG. 6 is a flow chart illustrating the contents of processing in the metering-mode discriminating means 17.

FIG. 6 shows a flow chart illustrating the contents of processing in the metering-mode discriminating means 17 which has been described in connection with FIG. 5. Now suppose the following multi-metering flag which is one at the multi-metering mode or which is zero at the central concentration metering mode.

As shown in the flow chart of FIG. 6, the multi-metering flag is first set at one and sequentially compared with the above three conditions (i) to (iii). If at least one condition is satisfied, the multi-metering flag will be reset to zero. Thereafter, the sequence will check this flag to change that metering mode to another metering mode.

Figure 7:
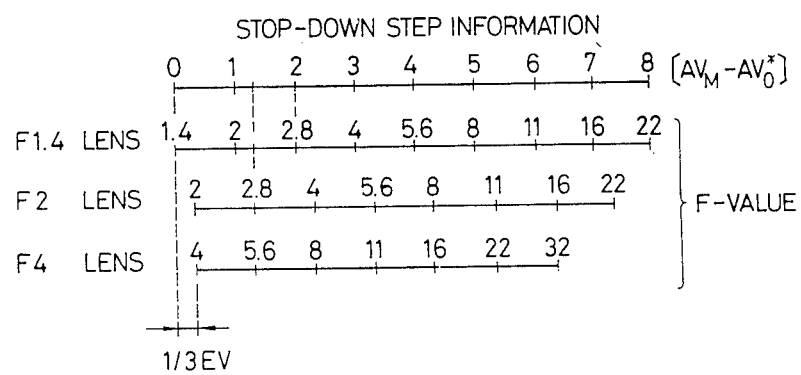
FIG. 7 illustrates stop opening steps ($AV_M-AV_O^*$)

FIG. 7 shows the contents of aperture step information ($AV_M - AV_0^*$) in the lens information of the lens information setting device 18. The value $AV_M$ represents an aperture value preset by the stop ring while the value $AV_0$ indicates an aperture value when the stop in an interchangeable lens is completely opened. The large aperture lens is adversely affected by Vignetting or the like. If the large-aperture lens is used in the present invention, there is less light received by the large-aperture lens since the stop is completely opened in the camera according to the present invention on the photometric operation. As shown in FIG. 7, therefore, the aperture step of the large-aperture lens (F 1.4) is shifted out of those of other lenses (F2, F4 and so on), for example, in the order of one-third when the transmitting member used for the aperture step information. The afore-mentioned value $AV_0^*$ includes the deviation of the true opened value AV by one-third step. For example, when it is considered to control the lens of F2.8, it has the following differences from the other lenses of F1.4 and F2;

$$AV_M - AV_0^* = 2 \quad (F1.4 \text{ lens}) \tag{1},$$

$$AV_M - AV_0^* = 1\tfrac{1}{3} \quad (F2 \text{ lens}) \tag{2}$$

For example, at the A-mode, a shutter speed to be controlled becomes $$TVs = (BV - AV_0) + SV - (AV_M - AV_0^*) \tag{3}$$

from the apex operation formula where SV is apex film sensitivity value, $AV_M$ is preset aperture value and TVs is shutter speed to be controlled.

When the formula (3) is compared respectively with the formulas (1) and (2), there are obtained the following formulas:

$$TVs = (BV - 1) + SV - 2 \quad (F1.4 \text{ lens}; AV_0 = 1) \tag{4};$$

and $$TVs = (BV - 2) + \tfrac{1}{3} + SB - 1\tfrac{1}{3}(F2 \text{ lens}; AV_0 = '1) \tag{5}.$$

The term ($+\tfrac{1}{3}$) in the formula (5) is due to increase of the relative open metering output by $\tfrac{1}{3}[EV]$ in the F2 lens without influence of the Vignetting in comparison with the F1.4 lens of 50 mm in which the open metering output is lowered due to the Vignetting. Consequently, the formulas (4) and (5) can be rewritten to be:

$$TVs = BV + SV - 3 \tag{6}.$$

This means that both the F1.4 and F2 lenses can be controlled by the same shutter speed. At stop values F1.4-F1.4 $\tfrac{1}{3}$ in the F1.4 lens, the stop is not mechanically connected to the electrical circuit so that even when the stop is opened at F1.4, the camera will not discriminate the increase of quantity of light. Even when the large-aperture lens is metered at its opened state, the control is effected in such a condition that the stop is decreased for exposure or that there is no Vignetting. Therefore, when the control is effected at the opened stop, the value is estimated to be lowered by an amount corresponding to $\tfrac{1}{3}[EV]$ due to the Vignetting. In brief, when F1.4 lens of 50 mm is used as a reference lens, the large-aperture lens such as F1.4 lens is not compensated at its non-open state and estimated lower by $\tfrac{1}{3}[EV]$ with respect to amount of light at its open state (control over $\tfrac{1}{3}[EV]$). In F2 and other lenses different from the large-aperture lens, the amount of light is estimated lower by $\tfrac{1}{3}[EV]$ or controlled over $\tfrac{1}{3}[EV]$.

As can be seen from the foregoing, the compensation of the opened stop has been carried out in the prior art system in which the exposure is controlled by the use of a single metering output.

Figure 8A:
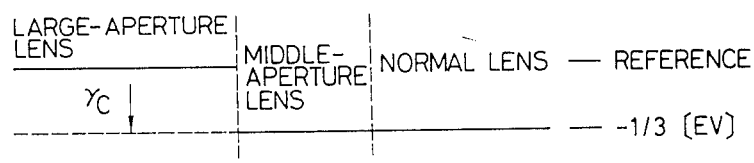
FIG. 8A illustrates the compensation of photometric outputs in the central section of the field to be photographed.
Figure 8B:
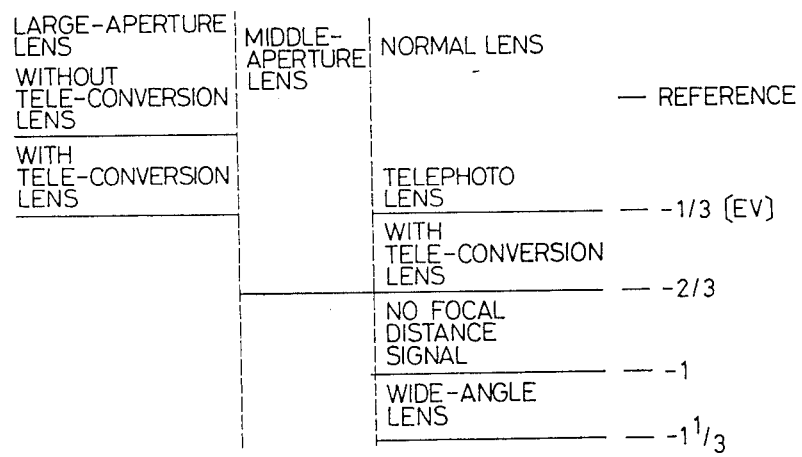
FIG. 8B illustrates the basic compensation of photometric outputs in the marginal section of the field to be photographed.

FIG. 8A shows a graph having a horizontal axis indicating aperture values increasing to rightward (opening is decreased) and a vertical axis indicating compensations relative to the aperture values in the central field section. These compensations are determined based on the large-aperture lenses including the conventional F1.4 lens of 50 mm. In this central field section, the principle described with reference to FIG. 7 is realized. When the large-aperture lenses are used as reference lenses as shown by solid line, the other lenses are estimated lower by $\tfrac{1}{3}$ steps. When the large-aperture lens is opened, the amount of light is decreased by $\tfrac{1}{3}$ steps. The aperture value must correspondingly be compensated lower by $\tfrac{1}{3}$ steps as shown by $\gamma_c$. FIGS. 8B and 8C show compensations to metering outputs at the marginal field sections. FIG. 8B shows the state at the stop down. FIG. 8C shows compensations added to compensations of FIG. 8B at the opened stop. In FIG. 8C, $\gamma_{p1}$ and $\gamma_{p2}$ indicate the added compensations. The compensations at the marginal field sections are determined by using the principle proposed by U.S. Pat. No. 4,306,787. In addition to this principle, information of conversion lenses is newly taken. There are presently known two types of conversion lenses. One type of conversion lens is located forwardly of a master lens to change its focal length or to provide a fish-eye lens. This type of conversion lens is called "front conversion type lens." The other type of conversion lens is mounted between the camera body and the master lens to change its focal length as in the single-lens reflex camera. This is called "rear conversion type lens". Generally, the latter includes a teleconversion lens which is used as a telephoto lens to increase the focal length 1.4 times to three times in the single-lens reflex camera. The mounting of such a lens changes focal length and at the same time effective aperture value. Thus, the large-aperture lens loses its proper function while the conventional lens functions as a telephoto lens. It is therefore required that the teleconversion lens is provided with means for producing a discriminating signal and at the same time that the camera is provided with means for detecting this signal and compensating this metering output in accordance with the signal. FIGS. 8B and 8C show the compensations of metering outputs at the marginal field sections which are gathered for detecting the above signals. Even in the marginal field sections, the large-aperture F1.4 lens of 50 mm is used as a reference lens. When the F1.4 lens of 50 mm is used, the photo-current is decreased substantially at the marginal field sections in comparison with the central field section. The metering circuit 11 is shifted in level after logarithmic compression and adjusted with respect to metering outputs corresponding to the field sections $Z_0$–$Z_4$ such that the same output will be produced when the F1.4 lens of 50 mm is arranged as a reference lens to meter its uniform bright surface. Thus, the multi-metering operation processing can be carried out without compensation of metering outputs unless the F1.4 lens of 50 mm is normally used. If a different type lens is used, however, it is required to compensate the metering outputs in accordance with increase of the amount of light at the marginal sections. Although the metering output at the central section is compensated separately from lenses other than the large-aperture lens, the compensation of metering outputs at the marginal field sections is carried out respectively on three groups, that is, large-aperture lenses, middle-aperture lenses and normal lenses. If a large-aperture lens is combined with a teleconversion lens, the effective aperture value is changed so that the compensation of $-\frac{1}{3}[EV]$ is required as seen from FIG. 8B.

The middle-aperture lens has less range of its focal length and the focal length is less changed as the teleconversion lens is combined therewith so that the compensation can be determined substantially to $-\frac{2}{3}[EV]$. In the group of normal lenses each of which has an open aperture value larger than those of the middle-aperture lenses, differences in focal length and changes in combination with the teleconversion lens become conspicuous. Thus, it is required to such circumstances that the compensation is effected to $-\frac{1}{3}[EV]$ in lenses each having a focal length over a predetermined value (referred to as telephoto lens), to $-\frac{1}{3}[EV]$ with the teleconversion lens, and to $-1\frac{1}{3}[EV]$ in lenses each having a focal length less than the predetermined value (referred to as wide angle lens). Although the compensation can manually be adjusted compatible with focal length and teleconversion lens used, in a case where it can automatically be adjusted as a lens is mounted in the camera, rescue means is required. The compensation of $-1$ [EV] in a lens having no focal length signal is determined to be intermediate value between various lenses.

FIG. 8C illustrates differences in compensation between the open condition and the other conditions in the lens. When the lens is opened, the compensation is changed more at the marginal field sections than at the central field section. When the large-aperture lens is opened with respect to its aperture, the compensation $\gamma_{p1}$ becomes $-\frac{2}{3}[EV]$. On the other hand, when lenses other than the large-aperture lens are opened with respect to aperture a compensation $\gamma_{p2}$ becomes $-\frac{1}{3}[EV]$.

FIGS. 9A and 9B show, because the compensation and aperture value at the central field section is a portion of the compensations and aperture values at the marginal field sections, what common portion is removed from those at the marginal field section. Therefore, when the compensation shown by solid line in FIG. 8A is added to that shown in FIG. 9A, the result becomes identical with the compensation of FIG. 8B. Also, when the compensation $\gamma_c$ shown by dotted line in FIG. 8A is added to the compensation $\gamma_p$ shown by dotted line in FIG. 9B, the result becomes identical with the compensation $\gamma_{p1}$ or $\gamma_{p2}$ shown in FIG. 8C.

Figure 10:
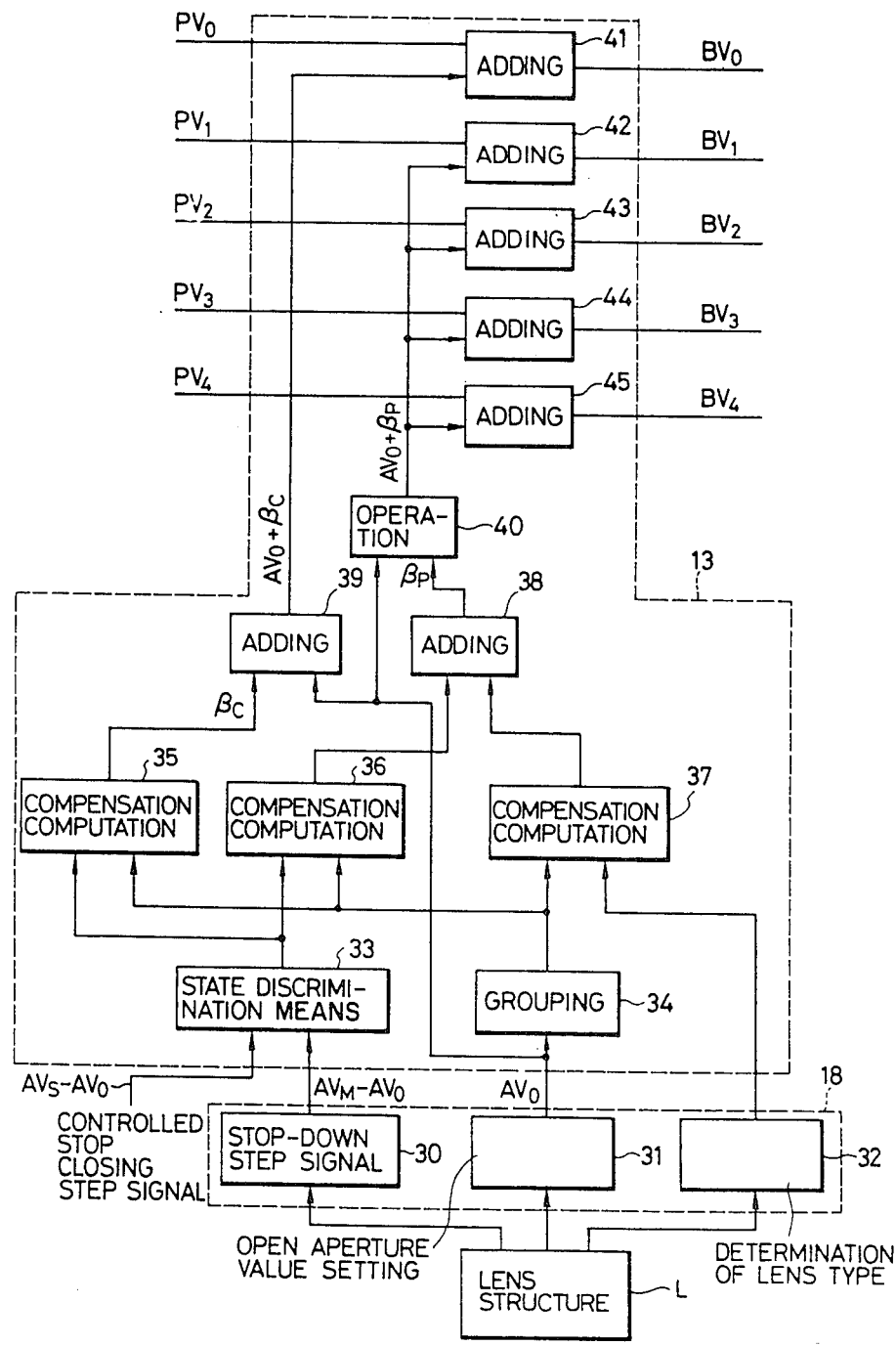
FIG. 10 is a block diagram showing stop opening compensating means 13 and information setting means 18.

FIG. 10 is a block diagram showing the open aperture compensating means 13 and the lens information setting device 18. The lens information setting device 18 comprises stop-down step setting means 30, open aperture value setting means 31 and lens type setting means 32 which are adapted to produce stop step signal ($AV_M - AV_0$), open aperture value signal $AV_0$ and signal relating to the type of lens used, respectively.

A state discriminating means 33 is provided to discriminate either of the open or non-open state of the lens used in accordance with the stop-down step setting signal ($AV_M - AV_0$) from the stop-down step setting means 30 and the controlled stop-down step signal ($AV_S - AV_0$) from the apex operation circuit 19 where $AV_S$ represents the controlled aperture value for obtaining a proper exposure. When the preset aperture value $AV_S$ corresponds to the opened stop, the stop is necessarily opened. However, when the set aperture value is in the minimum value in that interchangeable lens and if any mode in which the aperture value can be changed, such as shutter speed preferential mode or program mode is established in the camera, the stop may be controlled to open. Therefore, the state discriminating means 33 determines the open state of the stop based on these two signals.

There is further provided group classifying means 34 for classifying lenses used into groups. The group classifying means 34 is adapted to classify lenses used into groups of large-aperture lens, middle-aperture lens and normal lens.

Compensation operation means 35 is further provided to determine the compensation for the central field section shown in FIG. 8A in incorporation with the state discriminating means 33 and group classifying means 34. On the other hand, compensation operation means 36 determines the compensation for the marginal field sections shown in FIG. 8C in cooperation with the state discriminating means 33 and group classifying means 34 and at the same time provides the compensation due to whether or not the lens is opened.

Compensation operating means 37 operates a basic compensation at the marginal field sections shown in FIG. 8B in accordance with information of the opened aperture size and type of lens respectively from the group classifying means 34 and lens type setting means 32. Operation means 38 provides a single compensation obtained by adding two compensations relating to the marginal field sections in the compensation operating means 36 and 37 to each other. Operation means 39 and 40 each add the open aperture value signal $AV_0$ from the open aperture value setting means 31 to the compensation $\beta c$, $\beta p$ in the operation means 35 or 38 to the central or marginal field sections (both the values $\beta c$ and $\beta p$ are negative) so as to produce values $AV_0 + \beta c$ and $AV_0 + \beta p$ at the respective outputs. Operation means 41 adds the central-section metering output $Pv_0$ in the photometry circuit 11 to the output $AV_0 + \beta c$ from the operation means 39 to provide a brightness value:

$$BV_0 = PV_0 + AV_0 + \beta_c \qquad (7).$$

The term $\beta_c$ will now be described below. When the camera is controlled by the use of a reference lens at a reference stop, the value $\beta_c$ is adjusted to be zero for a proper exposure. When the stop is opened or the lens is replaced by another lens to change the relationship between the metering output $PV_0$ and the brightness value $BV_0$ of the object corresponding to the metered section $Z_0$ (effective brightness value including the illuminance at the film surface), the value $\beta_c$ is determined in such a manner that even if the value $PV_0$ is changed, there is no change in the value $BV_0$.

Although only the value $\beta_c$ may be compensated, it is also required to use the open aperture value $AV_0$ since it is considered in the present invention, various levels in brightness at the individual divided and metered sections are important in the operating process of the multi-metering operation processing menas 14. One of the processing contents of the multi-metering operation processing means 14 is to cut brightness values exceeding a predetermined value. Even if brightness value are in the same level, metering outputs in the respective F1.4 and F4 lenses are different from each other. This must be compensated.

Similarly, operation circuits 41 to 45 respectively add marginal section metering outputs $PV_1$-$PV_4$ from the photometry circuit 11 to the output $AV_0 + \beta_p$ of the operation means 40 to provide the following values:

$$BV_1 = PV_1 + AV_0 + \beta_p \quad (8);$$

$$BV_2 = PV_2 + AV_0 + \beta_p \quad (9);$$

$$BV_3 = PV_3 + AV_0 + \beta_p \quad (10);$$

and $$BV_4 = PV_4 + AV_0 + \beta_p \quad (11).$$

The value $\beta_p$ will now be described below. Where the camera is controlled relative to a surface of uniform brightness by the use of the reference lens and stop, adjustment is such provided that both the values $\beta_c$ in the formulas (7) and $\beta_p$ in (8) to (11) will be zero to provide a proper exposure. When the metering outputs $PV_0$-$PV_4$ relating to the respective metering sections $Z_0$-$Z_4$ are respectively changed relative to the brightness values $BV_0$-$BV_4$ (effective values including the illuminance on the film surface) corresponding to the respective metering sections, the values $\beta_c$ and $\beta_p$ are established such that the values $BV_0$-$BV_4$ will not be changed even if the $PV_0$-$PV_4$ are changed, respectively.

Figure 11:
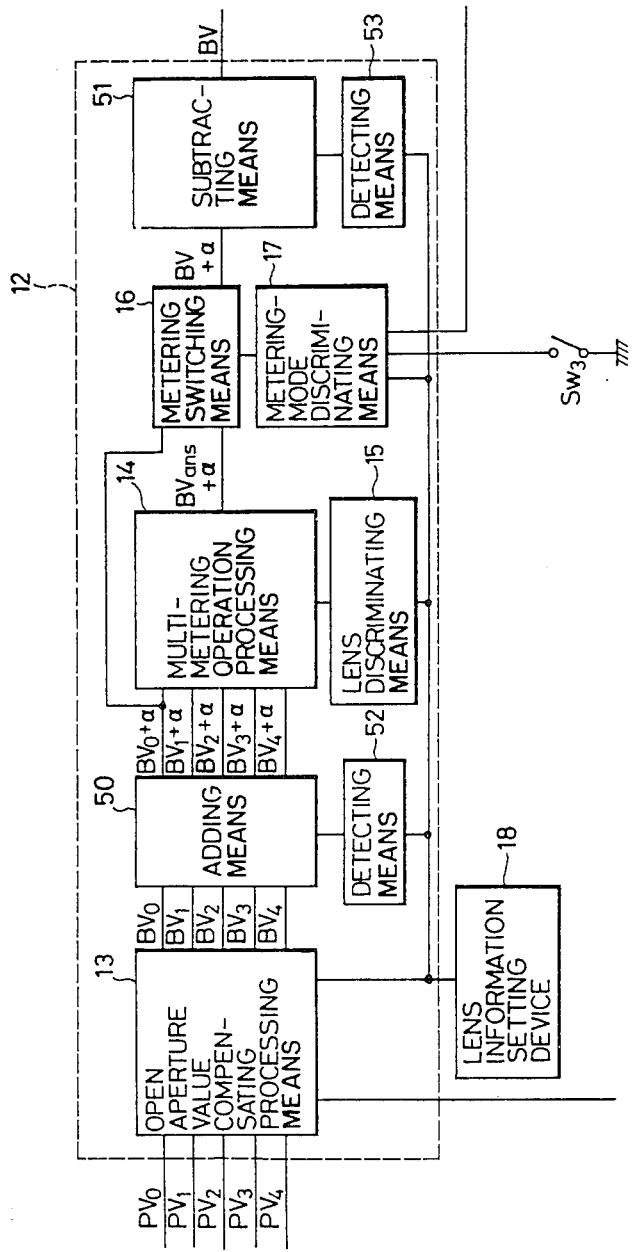
FIG. 11 is a block diagram showing another form of the multi-metering operation processing means.

FIG. 11 is another block diagram indicating another function of the generic multi-metering operation processing device. The device comprises an adding means 50, subtracting means 51 and teleconversion lens detecting means 52 and 53 all of which are added to the construction shown in FIG. 4. As described hereinbefore, when mounted, the teleconversion lens causes the focal length and open aperture value to change. Even if the teleconversion lens is mounted in the camera to produce a signal indicative of the open aperture value to provide only information of the master lens, the brightness value must correspondingly be compensated by the decreasing of the effective open aperture value. As described hereinbefore, this is because it is required that the brightness value be approached to that of the object as possible as during the operation of said multi-metering operation processing means 14. Therefore, the detecting means 52 is adapted to detect the presence or absence of a teleconversion lens in accordance with a signal relating to the type of lens from the lens information setting means 18 (this signal corresponding to the output of the lens type setting means 32 shown in FIG. 10). When a teleconversion lens is mounted in the camera, therefore, the detecting means 52 adds an amount $\alpha$ compensating the decrease of light due to the mounting of the teleconversion lens to the outputs $BV_0$-$BV_4$ from the open aperture value compensating circuit 13 to provide outputs $(BV_0 + \alpha)$ to $(BV_4 + \alpha)$. When no teleconversion lens is mounted in the camera, the values $BV_0$-$BV_4$ are outputted therefrom as they are.

On the other hand, the detecting means 53 is adapted to subtract the above amount $\alpha$ from the output $BV + \alpha$ of the metering switching means 16 when the mounted teleconversion lens is detected. If the open aperture value is originally compensated as the teleconversion lens is mounted in the camera, such a subtracting process is not required because the apex operation processing means 19 is indicated and controlled only by effective aperture values. Where F2.8 lens has stop steps F2.8 through F32, however, effective aperture values F5.6 to F64 are obtained when a two-times teleconversion lens is mounted in the camera. When the stop is controlled to be opened when F5.6 is indicated as at the S-mode, it may be misunderstood as if the stop is closed by two steps from the complete open state thereof. Teleconversion lenses for increasing the focal length respectively 1.4 times and two times decrease the open aperture value to 1[EV] and 2[EV], respectively. If these two teleconversion lenses can be discriminated, they can individually be compensated. If not so, the compensation has to be compatible with either of two teleconversion lens or the mediate value therebetween. It is rather preferred that the indication is carried out based on the aperture value of the master lens in view of the afore-mentioned advantages. When a teleconversion lens is mounted in the camera, the adding means 50 must shift the brightness value up while the subtracting means 51 must conversely shift it down.

Figure 12:
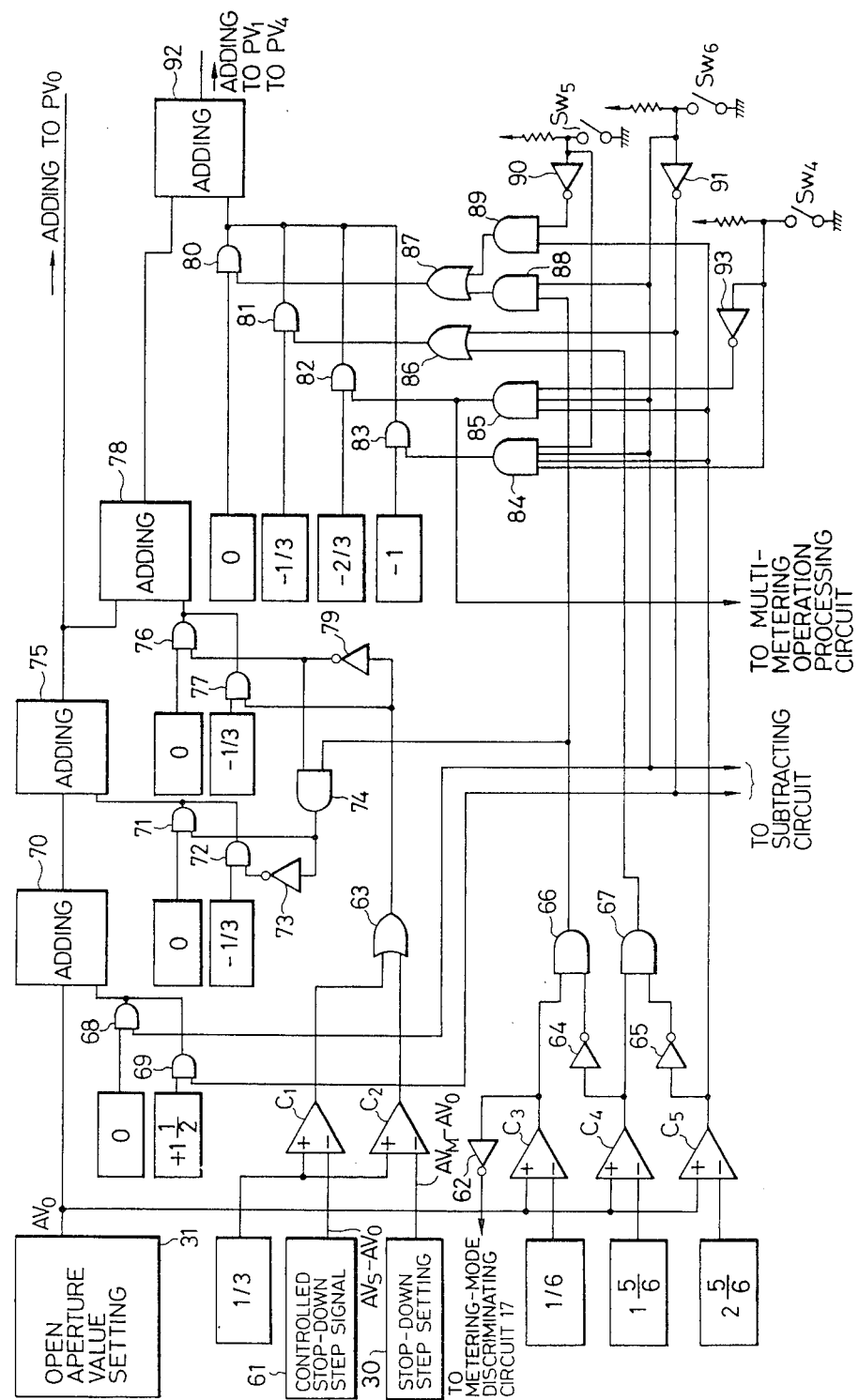
FIG. 12 is a block diagram showing the details of the stop opening compensating means.

FIG. 12 shows the details of the open aperture value compensating means 13 and stop information setting means 18 shown in FIG. 11 in addition to the adding means 50 and detecting means 52.

Adders 75 and 92 corresponds to the operating means 39 and 40 shown in FIG. 10, respectively. Adder 70 adds the shifted-up amount $\alpha$ due to the mounting of the teleconversion lens to the value $AV_0$ so that the outputs of the adders 75 and 92 will include this amount $\alpha$. The output of the adder 75 is added to the central section metering output $PV_0$ of the photometry circuit 11 in the operating circuit 41 shown in FIG. 10. Similarly, the output of the adder 92 is added to the marginal section metering outputs $PV_1$-$PV_4$ of the photometry means 11 by the operating circuits 42 to 45.

The stop-down step setting means 30 and open aperture setting means 31 operate as described in connection with FIG. 10. Switches $SW_4$, $SW_5$ and $SW_6$ function and operate to discriminate the type of lens used and correspond to the lens type setting means 32.

Information obtained by mounting an interchangeable lens will now be described below. The stop-down step setting means 30 detects the rotation of the stop ring on the lens by detecting the movement of a member (not shown) operably associated with the stop ring to produce a stop-down step signal $(AV_M - AV_0)$. This signal is a most basic signal provided in all lenses except lenses in which stops are not changed such as reflex lenses or lenses operating in different manners. The open aperture value setting means 31 detects the position of an open aperture value transmitting lever (not shown) which depends on the opened aperture of the lens by detecting the movement of a member operably associated with the above lever to produce an open aperture value signal $AV_0$. The movement of the associated member is decreased as the aperture of the lens is increased, while the movement of the associated member is increased as the aperture of the lense is decreased. When a lens having no open aperture value signal is mounted in the camera, the lever is not moved so that its open aperture value setting signal will be smallest.

When a lens having a focal length over a predetermined value is mounted in the camera, the switch $SW_5$ is turned on since the member associated with the camera is moved by the focal length signal lever (not shown). This switch serves to detect the mounting of telephoto lenses.

The switch $SW_6$ is turned on by further moving the associated member of the focal length signal lever under the operation of the focal length signal lever when a teleconversion lens is mounted in the camera and then detects the mounted teleconversion lens. This technique is known, for example, from U.S. pat. No. 4,314,752.

When both the switches $SW_5$ and $SW_6$ are in OFF state, this normally means that any lens having its focal length smaller than the predetermined value (referred to as wide angle lens) is mounted in the camera and also means that any lens having no focal length signal lever is mounted in the camera. The switch $SW_4$ serves to discriminate these two states. When a lens having no focal length signal lever is mounted in the camera, the switch $SW_4$ is turned on while when a lens having its focal length signal lever is mounted in the camera, the same switch is turned off. This is accomplished by causing the switch $SW_4$ to be operated in ON- and OFF- manner by the member associated with the camera (unshown) so that the portion of the lens having no focal distance signal contacted with the camera is formed flat and the portion of the lens having focal distance signal contacted with the camera is formed in the recess. Further, the teleconversion lens serves to transmit the values $AV_M - AV_0$ and $AV_0$ of the master lens as they are and also to close the switch $SW_6$.

Lenses to be discriminated will now be described below.

[Group 1] Lenses without open aperture value signal. The mode is changed to the central concentration metering mode.

[Group 2] Lenses with open aperture value signal and without focal distance value signal.

(a) Large-aperture lenses and middle-aperture lenses; No problem.

(b) Normal lenses; the multi-metering operation processing is simplified.

[Group 3] Lenses with open aperture value signal and focal length signal; there is not particularly a problem.

[Group 4] Lenses each having a teleconversion lens mounted between it and the camera.

(a) A lens having no open aperture value signal which is mounted in the camera; the mode is changed to the central concentration metering mode.

(b) Lenses belonging to the groups 2 and 3 which are mounted in the master lens; there is not particularly a problem.

Lenses belonging to the groups 1 and 4 (a) have no information of the open aperture value $AV_0$ when they are mounted in the camera, so that such compensations as described with reference to FIGS. 8A to 8C, 9A and 9B cannot be carried out at all and that metering outputs cannot be converted into brightness values at all. As a result, the multi-metering operation processing means 14 provides an unsatisfactory result. Therefore, the central concentration metering mode is selected.

Lenses belonging to the group 2 (b) must be arranged to provide intermediate compensated values of open aperture as in FIGS. 8A to 8C, 9A and 9B since they are not discriminated whether the lens used is a telephoto or wide-angle lens. It is not significant to provide a delicate processing in the multi-metering operation processing means 14. The construction should be simplified. This simplification will be described with reference to FIG. 13.

Lenses belonging to the group 4 are substantially identical with the lenses belonging to the group 1 if the master lens does not have an open aperture value. However, the lenses in the group 4 can be compensated with their open aperture values as shown in FIGS. 8A to 8C, 9A and 9B and without problem since the information of the teleconversion lens is transmitted to the camera even when the master lens belongs to the group 2 (b).

Now returning to FIG. 12, there is shown a comparator $C_1$ to which a controlled stop-down step signal $AV_s - AV_0$ and a constant $\frac{1}{3}[EV]$ are supplied from a controlled stop-down step generator 61. The comparator $C_1$ becomes high level when $$AV_s - AV_0 < \tfrac{1}{3} \tag{12}$$

Similarly, a comparator $C_2$ receives a set stop-down step signal $AV_M - AV_0$ and the constant $\frac{1}{3}[EV]$ so that it becomes high level when $$AV_M - AV_0 < \tfrac{1}{3} \tag{13}$$

OR gate 63 becomes high level when either of the formula (12) or (13) is satisfied, that is, when the camera is controlled to be opened in any event.

Comparators $C_3$, $C_4$ and $C_5$ receive an open aperture value signal $AV_0$ and constants 1/6, 1 5/6 and 2 5/6 from the open aperture value setting means 13, respectively. They become high level respectively when $$AV_0 > 1/6 \tag{14}$$

$$AV_0 > 1\,5/6 \tag{15}$$

and $$AV_0 > 2\,5/6 \tag{16}$$

Therefore, an invertor 62 transmits high level to the metering mode switching means 17 to change the present mode to the central concentration metering mode when $$AV_0 \leq 1/6 \tag{17}$$

that is, when the lever for transmitting the open aperture value has no motion (there is no open aperture value signal).

AND gate 66 receives the output of the comparator $C_4$ inverted by an invertor 64 and the output of the comparator $C_3$ and becomes high level when $$1/6 < AV_0 \leq 1\,5/6 \tag{18}$$

that is, when a large-aperture lens is mounted in the camera. Similarly, AND gate 67 becomes high level when $$1\,5/6 < AV_0 \leq 2\,5/6 \tag{19}$$

that is, when a middle-aperture lens is mounted in the camera. When the formula (16) is satisfied, the comparator $C_5$ becomes one (1) which corresponds to a normal lens mounted in the camera.

Adder 70 is provided to add the open aperture value $AV_0$ of the open aperture value setting means 31 to a constant 0 or $1\frac{1}{2}$ which is selected by a gate 68 or 69. When no teleconversion lens is mounted in the camera, the switch $SW_6$ is turned off to open the gate 68 so that the constant 0 will be selected to provide the output $AV_0$ of the adder 70. On the other hand, when a teleconversion lens is mounted in the camera, the switch $SW_6$ is turned on to made at high level the output of an invertor 91 and to open the gate 69 so that the constant $1\frac{1}{2}$ will be selected to provide the output $(AV_0+1\frac{1}{2})$ of the adder 70. Thus, the effective open aperture values changed by the 1.4 and 2 times teleconversion lenses are together compensated into an intermediate value. The output of this adder 70 is used to compensate the central and marginal section metering outputs. Thus, the adder 50 shown in FIG. 11 will effectively be operated.

Adder 75 is provided to add the output of the adder 70 to the output 0 or $-\frac{1}{3}$ which is selected by the gate 71 or 72.

When the output of the OR gate 63 is equal to zero, the output of an invertor 79 becomes high level. When the output of AND gate 66 is equal to high level, the output of AND gate 74 becomes high level to open the gate 71. Namely, when the large-aperture lens is not opened, the resulting value from the adder 75 becomes zero. On the other hand, when that condition is not fulfilled, the invertor 73 becomes open at its output to open the gate 72. Namely, when the mounted lens is not in the form of a large-aperture lens or when a large-aperture lens is opened, the value obtained by the adder 75 becomes $-\frac{1}{3}$. Thus, the adder 75 will effect the compensation with respect to the central field section shown in FIG. 8A. This is then added to the central section metering output $PV_0$ of the photometry means 11. On the other hand, this output also is used to determine the compensation with the marginal section open aperture value.

Adder 78 is provided to add the output of the adder 75 to a constant 0 or $-\frac{1}{3}$ which is selected by a gate 76 or 77.

When not opened, the output of the invertor 79 becomes high level to open the gate 76 to select zero. On the other hand, when the lens is opened, the output of the OR gate 63 becomes high level to open the gate 77 to select the constant $-\frac{1}{3}$. In other words, the adder 78 adds zero when the lens is not opened or $-\frac{1}{3}$ when the lens is opened to the compensated open aperture value relative to the central field section which is the output of the adder 75. In this manner, there will be effected the compensations described with reference to FIGS. 8A (including solid and dotted lines) and 9B. If the compensation shown in FIG. 9A is then carried out, the operation of compensation will be completed.

Adder 92 is provided to add the output of the adder 78 to one of constants 0, $-\frac{1}{3}$, $-\frac{2}{3}$ and $-1$ which is selected by a gate 80, 81, 82 or 83.

When a large-aperture lens is mounted in the camera so that AND gate 66 becomes high level and if the switch $SW_6$ is in its OFF state without teleconversion lens, the output of AND gate 88 becomes high level and the output of OR gate 87 also becomes high level to open the gate 80 so that the constant to be added will be selected to be zero. When a middle-aperture lens is mounted in the camera to make the output of AND gate 67 high level, the output of OR gate 86 becomes high level to open the gate 81 so that the constant to be added will be selected to be $-\frac{1}{3}$. When a teleconversion lens is mounted so that the switch $SW_6$ will be turned on, the output of invertor 91 becomes high level and the OR gate 86 becomes high level so that the constant to be added will be selected to be $-\frac{1}{3}$.

When the output of the comparator $C_5$ becomes high level and a normal lens is mounted in the camera and if no teleconversion lens is mounted the switch $SW_6$ is turned off. If a wide-angle lens is mounted under such a condition, the switches $SW_4$ and $SW_5$ are turned off so that the output of the AND gate 84 will be high level to open the gate 83 so that the constant to be added will be selected to be $-1$. On the other hand, when a lens having no focal length signal is mounted in the camera, the switch $SW_4$ is turned on to make the output of invertor 93 and the output of AND gate 85 high level to open the gate 82 so that the constant to be added will be selected to be $-\frac{2}{3}$. Finally, when a telephoto lens is mounted in the camera, the switch $SW_5$ is turned on (at the same time, the switch $SW_6$ will not be turned on) to make the outputs of invertor 90, AND gate 89 and OR gate 87 high level to open gate 80 so that the constant to be added will be selected to be zero.

In this manner, the adder 92 will completely compensate the open aperture value to compensate the marginal section metering outputs as described with reference to FIGS. 8A, 8B, 9A and 9B. In this connection, the output of the AND gate 85 also is used for information which causes the multi-metering operation processing means 14 to select the simplified process in cooperation with the lens discriminating means 15 shown in FIGS. 4 and 11.

FIGS. 13 to 16 illustrate how to change the multi-metering operation processing means 14 from one processing mode to another by the lens discriminating means 15. This may be achieved by several methods. The details thereof will be described in connection with flow charts.

Figure 13:
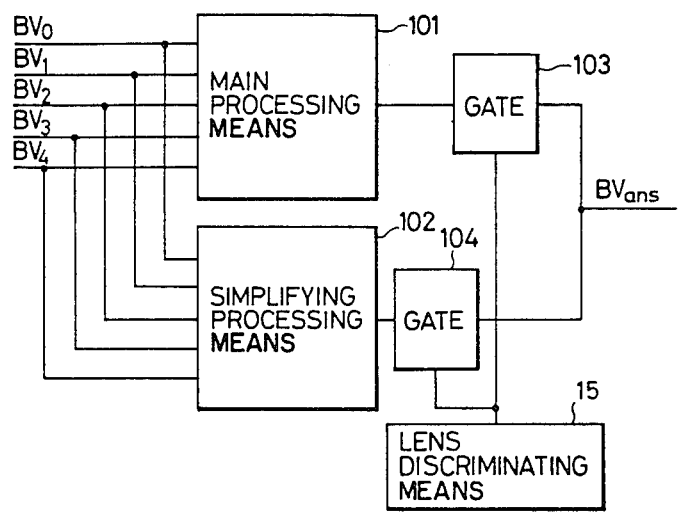
FIGS. 13 and 14 are block diagram showing two forms of the multi-metering operation processing means 14.

As seen from FIG. 13, the multi-metering operation processing means 14 comprises a main processing means 101, a simplifying and processing means 102 for simplifying the contents of processing to provide an acceptable result even if the open aperture value is insufficiently compensated, and gates 103 and 104 for switching the main processing means 101 to the simplifying and processing means 102 and vice versa in accordance with the output of the lens discriminating means 15.

Figure 14:
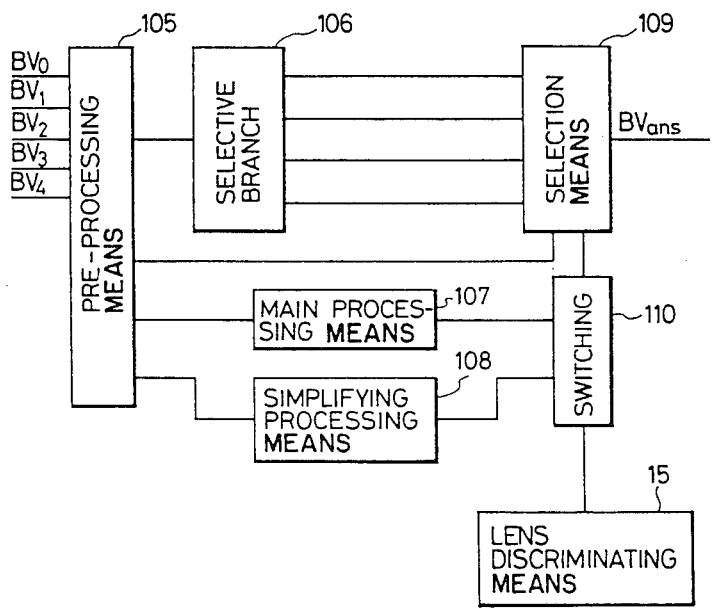

FIG. 14 shows another arrangement in which some excess components in FIG. 13 are omitted and some common parts are utilized.

In such an arrangement, a pre-processing means 105 is common to means 106 for generating selective branches to provide a proper exposure. Part of this common means is utilized to operate selector means 109 by the use of the output from the pre-processing means 105 such that one of the outputs of the selective branch generation means 106 will be selected as a proper exposure. As a result, the main processing means 107 and the simplifying and processing means 108 may be simplified in construction such that switching means 110 operably associated with the lens discriminating means 15 will cause one of the above two processing circuits to operate relative to the selector means 109 to carry out the remaining processing.

Figure 15:
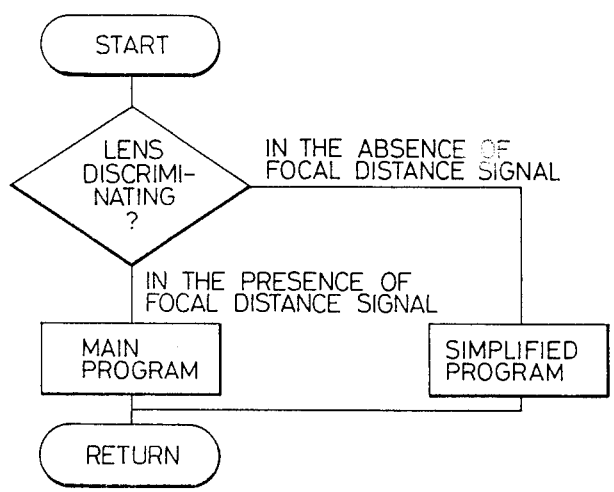
FIGS. 15 and 16 are flow charts of the multi-metering operation processing means 14.
Figure 16:
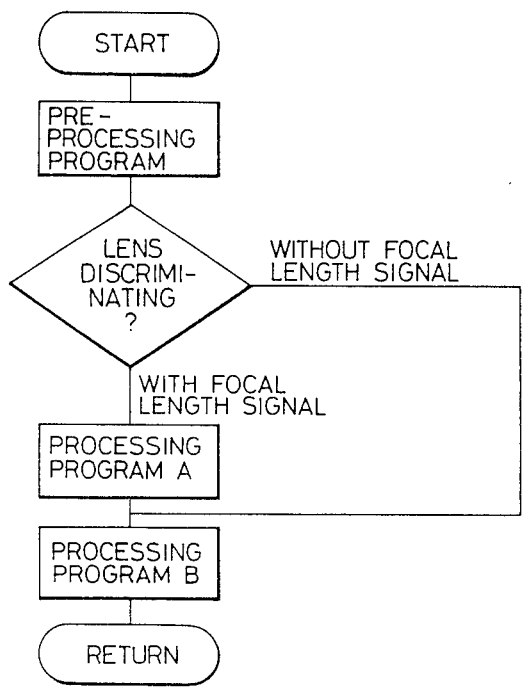

Flow charts shown in FIGS. 15 and 16 substantially correspond to FIGS. 13 and 14, respectively.

In FIG. 15, a lens is discriminated in accordance with the focal length signal to switch the main program to the simplified program and vice versa.

In FIG. 16, pre-processing programs are made common such that a processing program A will be jumped to provide a processing program B in accordance with the result obtained by discriminating the lens. If the delicate processing program A is executed relative to any lens having no focal length signal, the compensation would more highly be affected by error.

In this embodiment, the operation of the main processing means is achieved by the processing programs A and B while the simplifying and processing means is operated by the processing program B.

Figure 17:
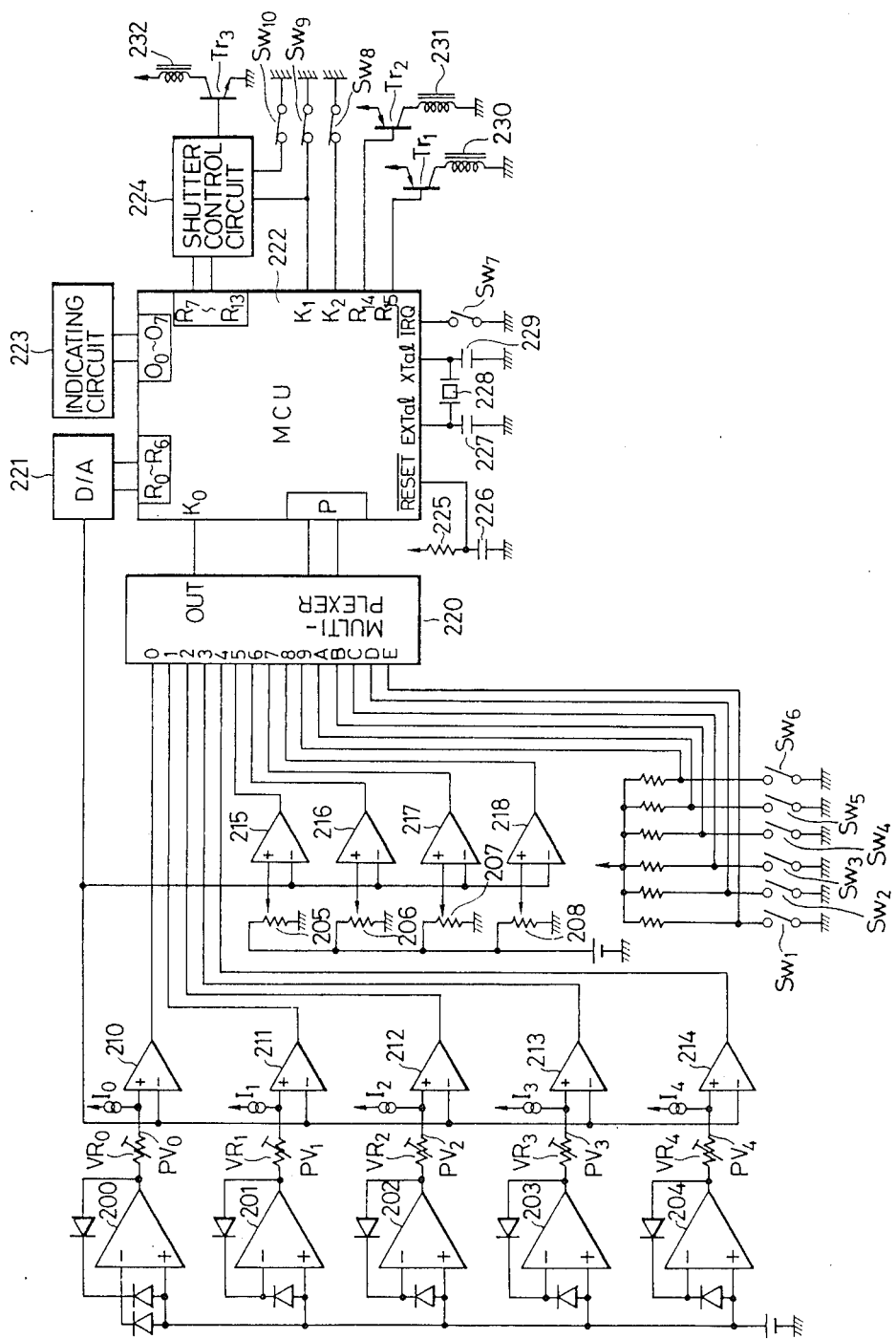
FIG. 17 is a circuit diagram illustrating an actually embodied construction of the present invention.

FIG. 17 shows a concrete construction of the embodiment of the present invention shown in FIGS. 4 and 12. This comprises known photometry circuits 200-204 with the photometry means 200 being used relative to the central field section ($Z_0$) shown in FIG. 1. The remaining photometry meanss 201-204 are adapted to produce metering outputs corresponding to the marginal field sections ($Z_1$-$Z_4$). The output of the photometry circuit 200 is coupled to a comparator 210 through a partially fixed resistor $VR_0$ and at the same time pulled up by a source of constant current $I_0$ to provide a level-shift by a voltage corresponding to $VR_0 \times I_0$. By mounting a reference lens (F1.4 lens of 50 mm in this embodiment) in the camera and adjusting the partially fixed resistor $VR_0$ to provide a predetermined output relative to a reference surface of uniform brightness, the metering output $PV_0$ may be obtained relative to the central field section $Z_0$. Similarly, the metering outputs $PV_1$-$PV_4$ relative to the marginal field section $Z_1$-$Z_4$ may be obtained by adjusting partially fixed resistors $VR_1$-$VR_4$ and sources of constant current $I_1$-$UR_4$, respectively. Thus, when the reference lens is mounted in the camera, the resistors $VR_0$-$VR_4$ are adjusted to equalize the metering outputs relative to the uniform brightness surface. An SPD corresponding to the central portion between right and left SPD's is connected parallel to the photometry means 200. Potentiometers 205-208 are provided to set film sensitivity information, shutter speed information, set stop-down step information and open aperture value information, respectively.

A sequential comparison comparator is provided to cause a multiplexer to produce an output. The multiplexer 220 receives 4-bit P-port outputs 0-$E of MCU 222 and selects the corresponding one of 15 signals inputted into the multiplexer 220, which is in turn transmitted to OUT terminal. Such a multiplexer is known in the art.

D/A converter 221 is of 7-bit type and includes terminals $Z^6$-$Z^0$ which are controlled by terminals $R_6$-$R_0$ of the MCU 222 to produce analog amounts in steps 0 through 127. Such a D/A converter also is known in the art.

MCU 222 may be commercially available and is, for example, 4-bit, one-chip microcomputer which is manufactured and sold by Fujitsu as Model MB8851. The following description will be made in connection with MB8851.

Sequential comparison and A/D conversion are executed by one of comparators 210-218 selected by the P-port output of MCU 220 through the multiplexer 220, the A/D converter 221 and MCU 222. Information so A/D converted and inputted to the MCU 222 is shown in Table 2 attached herewith.

Switches $SW_1$ and $SW_2$ execute ON and OFF shown in Table 1 depending on modes P,S,A and M selected by the mode selector dial. P-mode is such a mode that aperture value and shutter speed are determined by the camera in accordance with the brightness value of an object if the sensitivity of film only has been set. S-mode is a so-called shutter speed preferential type mode in which when a shutter speed is set, the corresponding aperture value is determined by the camera. On the contrary, A-mode is a so-called aperture preferential type mode in which when an aperture value is set, the corresponding shutter speed is determined by the camera. Finally, M-mode is a so-called manual mode in which an aperture value and shutter speed are manually determined in accordance with various indications. The operations of switches $SW_3$-$SW_6$ are together shown in Table 1 as described hereinbefore.

Resistor 225 and capacitor 226 are connected with the terminal $\overline{RESET}$ of the MCU 222 such that the latter can be reset as the camera is powered. A vibrator 228 is provided to produce a reference clock in the MCU 222 through capacitors 227, 229 and the internal oscillating means of the MCU 222. Switch $SW_7$ is a release switch which is connected with the terminal IRQ of the MCU 222. On release, the switch $SW_7$ can interrupt the MCU 222. $Tr_1$ is turned on to energize a release magnet 230 when the terminal $R_{15}$ of the MCU 222 becomes L. This causes the mechanical systems of the camera to initiate its sequence. $Tr_2$ is turned on to energize an aperture closing inhibiting magnet 231 to inhibit the aperture closing operation after release when the terminal $R_{14}$ of the MCU 222 becomes L. Switch $SW_8$ is an aperture closing initiating switch which is normally closed and which is turned off when the stop begins to open after release. Switch $SW_9$ is a mirror switch which is normally closed and which is turned off upon mirror-up and turned back on upon mirror-down. Switch $SW_{10}$ is a trigger switch which is normally closed and which is turned off as the forward blind of the shutter initiates to open.

Shutter control means 224 is provided to control the shutter at various speeds of 1-1/4000 seconds in accordance with values $R_{13}$-$R_7$ of the MCU 222. When the mirror is upwardly moved after release, the switch $SW_9$ is turned off to energize a transistor $Tr_3$ and to energize a rearward blind latching magnet 232 in the shutter in place of the mechanical latching. At the same time, the trigger switch $SW_{10}$ is turned off to de-energize the transistor $Tr_3$ after a shutter time set through one of the MCU terminals $R_{13}$-$R_7$ has elapsed and to de-energize the rearward blind latching magnet 232 so that the rearward shutter blind will be started to control the shutter at a desired speed.

Figure 18:
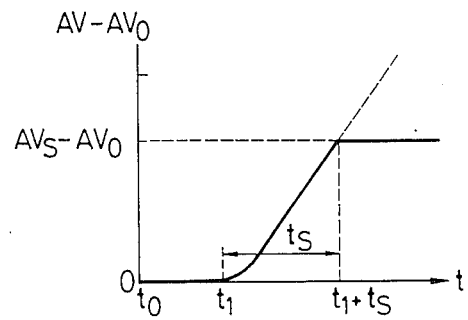
FIG. 18 illustrates timings for controlling the stop.

FIG. 18 illustrates the control of a stop with the horizontal axis representing time and with the vertical axis representing steps of the stop-down. If a lens used is controllable with its stop such that a stop-down step is proportional to the corresponding time during which the stop of the lens has been closed to that step, there is a linear relationship therebetween as shown in FIG. 18. Thus, if a period of time from a point $t_1$ at which the aperture closing operation is initiated after release at $t_s$ is determined, the stop can be controlled to the desired stop-down step $AV_s-AV_0$.

Figure 19A:
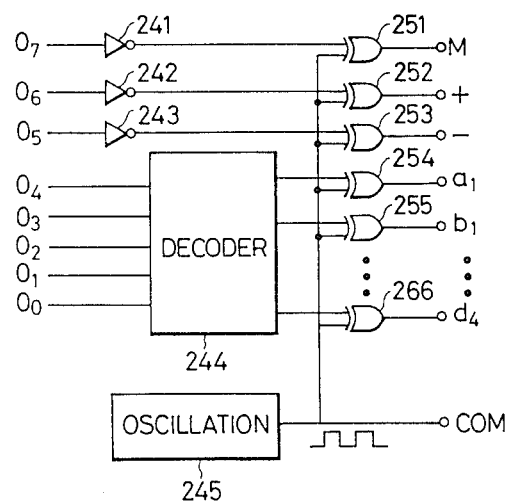
FIG. 19A is a block diagram of an indication circuit 223.
Figure 19B:
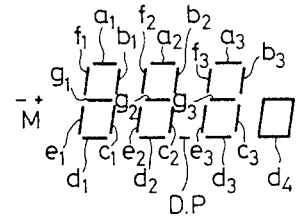
FIG. 19B illustrates a pattern indicated in the indication circuit 223.

FIG. 19A shows the construction of an indication means 223. To display exposure indications in the viewfinder through such an LCD (liquid crystal) as shown in FIG. 19B, the output stage includes exclusive OR's 251-266. An oscillator means 245 is provided to drive a common electrode COM. A decoder means 244 is provided to realize various indications. Inventors 241-243 are provided to produce high-level outputs when $O_7$-$O_5$ are respectively at L. The output of each of the exclusive OR's 251-253 is opposite to that of the COM terminal in phase. Thus, indications "M", "+" and "−" shown in FIG. 19B are displayed. When the outputs of the exclusive OR's 254-266 becomes opposite to the output of the COM terminal in phase through the decoder 244, any segment selected from 7 segments shown in FIG. 19B is colored to display such indications. Since the outputs of the MCU 222 become H when it is reset, the arrangement is such that when all the $O_7$-$O_0$ are at H, all the indications shown in FIG. 19B are erased.

Figures 20A, 20B:
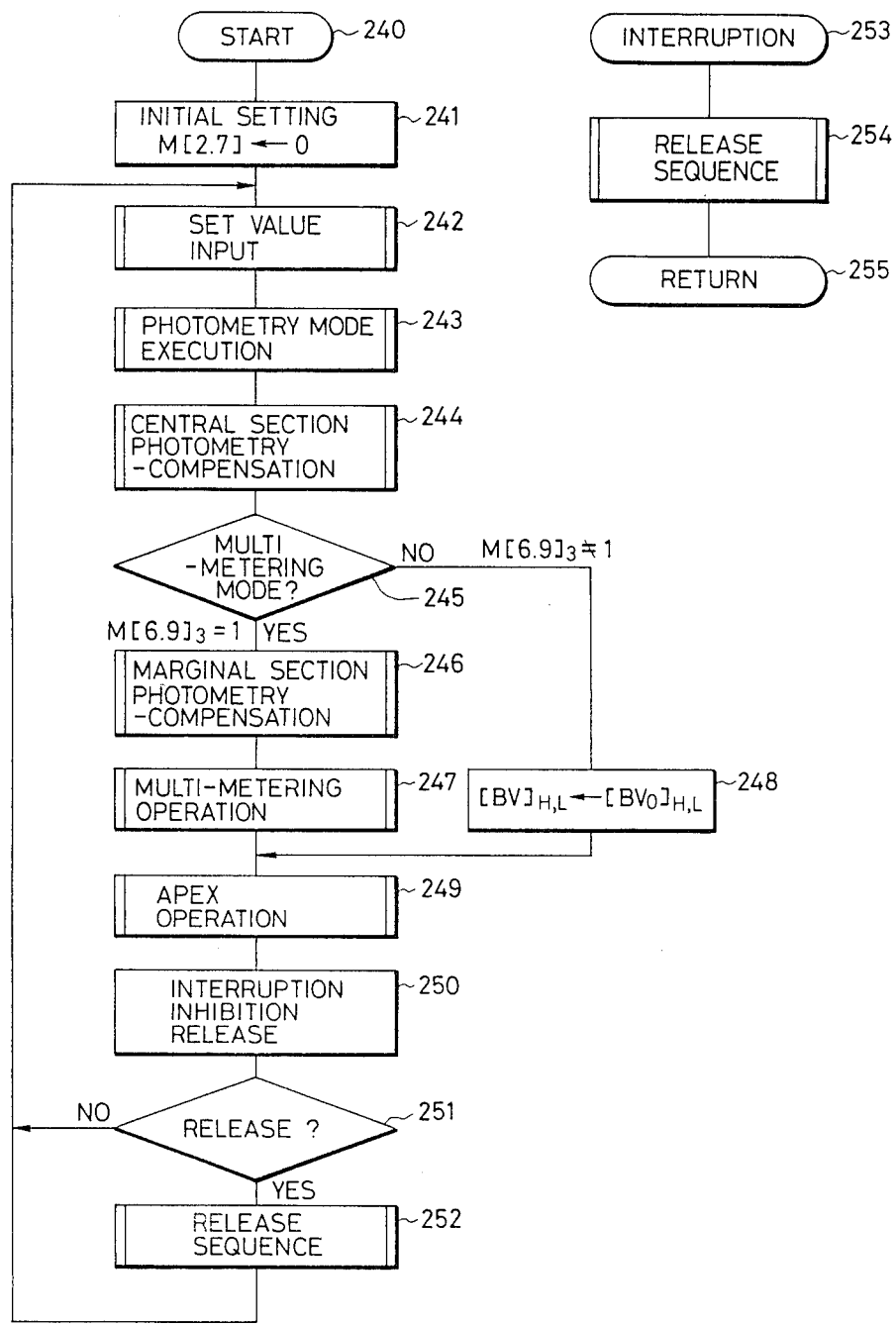
FIG. 20A is the general flow chart in MCU 222.
FIG. 20B is a flow chart on interruption processing in the MCU 222.

FIG. 20A is a flow chart of the MCU 222 shown in FIG. 17.

When the camera is powered, $\overline{RESET}$ terminal also is powered and reset to initiate the operation of the camera at Step 240. At the same time, the MCU 222 is in such a state that any interruption is inhibited therein. As a result, all the outputs thereof become H.

At Step 241 (initial setting), the memory at X=2, y=7 in RAM contained in the MCU 222 (referred to as M[2,7]) is first cleared. This is because information whether or not the stop is opened must be stored at M[2,7]. The construction of RAM in the MCU 222 is shown in Table 3 attached herewith. Thereafter, subsequent steps, that is, Step 242 at which the setting value is inputted, Step 243 at which the metering mode is processed and Step 244 at which the photometry and compensation is executed for the central field section are executed in accordance with the flow chart. The details of these steps will be described hereinafter. At Step 245, it is detected in M[6,9]$_3$ whether or not there is multi-metering mode. (The numeral suffixed to the right and lower position outside the bracket [ ] designates bit number on figure "$2^3$" in the 4-bit RAM which is specified by addresses X and Y.) As shown in FIG. 20A, therefore, the marginal section metering and compensating are executed at Step 246 and the multi-metering operation is carried out at Step 247. Alternatively, any jumping may be executed.

Subsequently, an apex operation is executed at Step 249, a release of interruption inhibition is executed at Step 250 and whether or not the release switch $SW_7$ has been turned on is checked at Step 251. If the release switch $SW_7$ has been turned on, release sequence begins at Step 252. If not, the program is returned to Step 242 for inputting the set value. During this process, if the release switch SW is turned on, $\overline{IRQ}$ becomes L to enter such an interruption routine as shown in FIG. 20B and also to enter the release sequence.

Figure 21:
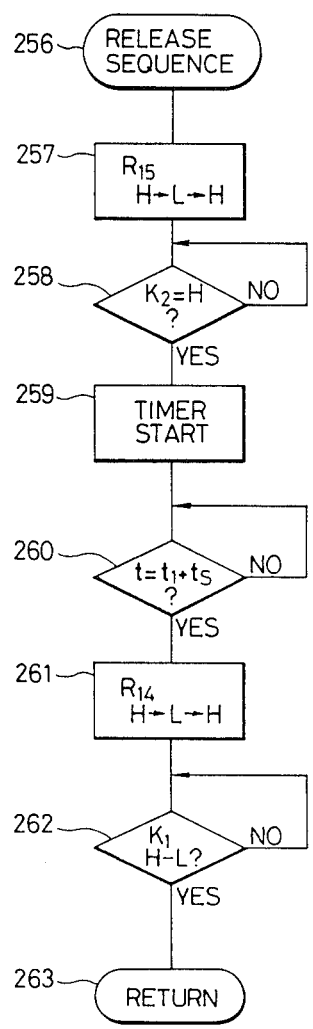
FIG. 21 is a flow chart of release sequence.

FIG. 21 shows the release sequence described with reference to FIGS. 20A and 20B. At Step 257, the terminal $R_{15}$ is changed from H level to L level and further to H level. During L level, transistor $Tr_1$ is energized to energize the release magnet 230 and to initiate the release sequence in the mechanical systems. At the same time, it is waited that the terminal $K_2$ becomes H level at Step 258. At Step 259, the stop closing initiating switch $SW_8$ is turned off to start the internal timer of the MCU 222. At Step 260, the program is made wait until $t=t_1+t_s$ as shown in FIG. 18. At Step 261, the terminal $R_{14}$ is changed from H level to L level and then to H level. During L level of this terminal, the transistor $Tr_2$ is placed at its conductive state to energize the stop closing inhibiting magnet 231 so that the operation of the stop will be stopped at a desired stop closing step $AV_s$−$AV_0$. Thereafter, the MCU 222 will be made wait until the terminal $K_1$ is changed from H level to L level at Step 262. After the release sequence of the mechanical systems has been completed and after mirror-down, the terminal $K_1$ becomes L to finish the release sequence if the mirror switch $SW_9$ is turned on.

On the other hand, the shutter control circuit 223 is controlled to a desired shutter speed which has been set at the terminals $R_{13}$-$R_7$ of the MCU 222 after mirror-up as described hereinbefore.

The flow chart shown in FIG. 20A will now be described in more detail.

Figure 22:
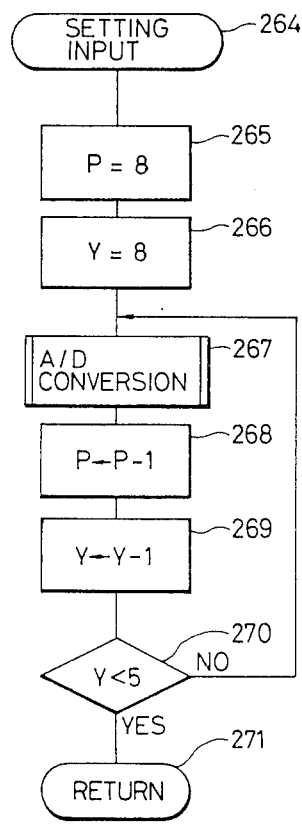
FIG. 22 is a flow chart of a setting input subroutine.

FIG. 22 shows a subroutine for set value inputting. At Step 264, the output of the P-port shown in FIG. 17 is set to be eight (8). At Step 265, Y register in RAM is set to be equal to eight (8). At Step 267, A/D conversion is executed such that the output of comparator 220 specified by 8 of the P-port is supplied to the terminal $K_0$ of the MCU 222 through the multiplexer 220. Thus, sequential comparison and A/D conversion is executed by D/A converter 221, comparator 218 and MCU 222 so that the open aperture value signal $AV_0$ of the setting means 208 is subjected to A/D conversion. As a result, lower rank 4 bits (referred to as $[AV_0]_L$) and upper rank 4 bits (referred to as $[AV_0]_H$) are respectively stored in M[7,8] and M[6,8] as shown in Table 3. It is to be remained in mind that the letters H and L suffixed to $[AV_0]$ mean upper and lower rank 4 bits, respectively. The $[AV_0]_{H,L}$ has the maximum value of $2A (where $ denotes hexadecimal number). Therefore, $[AV_0]_H$ actually includes only information of 2 bits. Hexadecimal numbers 0-9 and A-F correspond to decimal numerals 0-15 completely.

Subsequently, similar process is repeated until Y=5 at Step 270 by subtracting P-port and Y register each by one at Steps 268 and 269. In this manner, set stop closing step information $[AV_M-AV_0*]_{H,L}$ are respectively stored in M[6,7] and M[7,7], set shutter speed information $[TV_M]_{H,L}$ respectively in M[6,6] and M[7,6], and film sensitivity information $[SV]_{H,L}$ respectively in M[6,5] and M[7,5].

Figure 23:
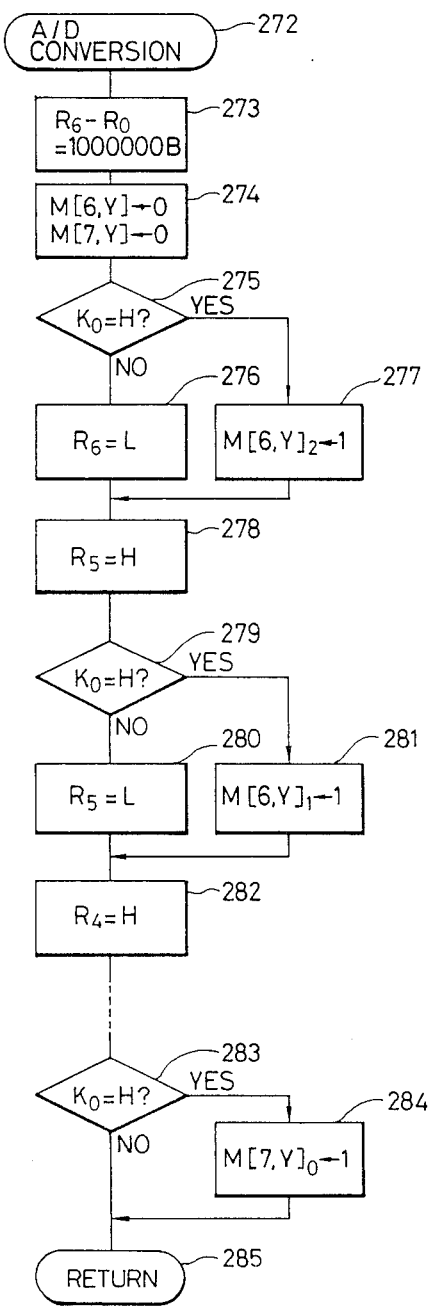
FIG. 23 is a flow chart of an A/D conversion subroutine.

FIG. 23 shows the details of the subroutine of A/D conversion shown in FIG. 22.

At Step 273, "1000000B" is set at the output ports $R_6$-$R_0$ of the MCU 222 shown in FIG. 17, where B denotes binary number. This causes D/A converter 221 to produce an analog amount corresponding to $2^6=64$. Such a value is one which is positioned substantially mediately relative to the entire changed amounts of 127.

Next, at Step 274, M[6,Y] and M[7,Y] are cleared. At Step 275, the input of the terminal $K_0$ is monitored. If the terminal $K_0$ is in H level, the output of the comparator specified by P-port also is in H-level. Thus, the analog amount to be metered is larger than $2^6$. At Step 277, therefore, numeral 1 is set at $2^2$ digit in M[6,Y] in which upper rank 4 bits are stored. If the output of the comparator is not in H level, the terminal $R_6$ is reset to remain the memory M[6,Y] as it is. At Step 278, the terminal $R_5$ is made H level to remain $2^5$ digit of the D/A converter 221 at one (1). Similar processes will sequentially be carried out for lower rank bits at Steps 282, 283 and 284. Finally, sequential comparison and A/D comparison are executed for 7 bits.

Figure 24A:
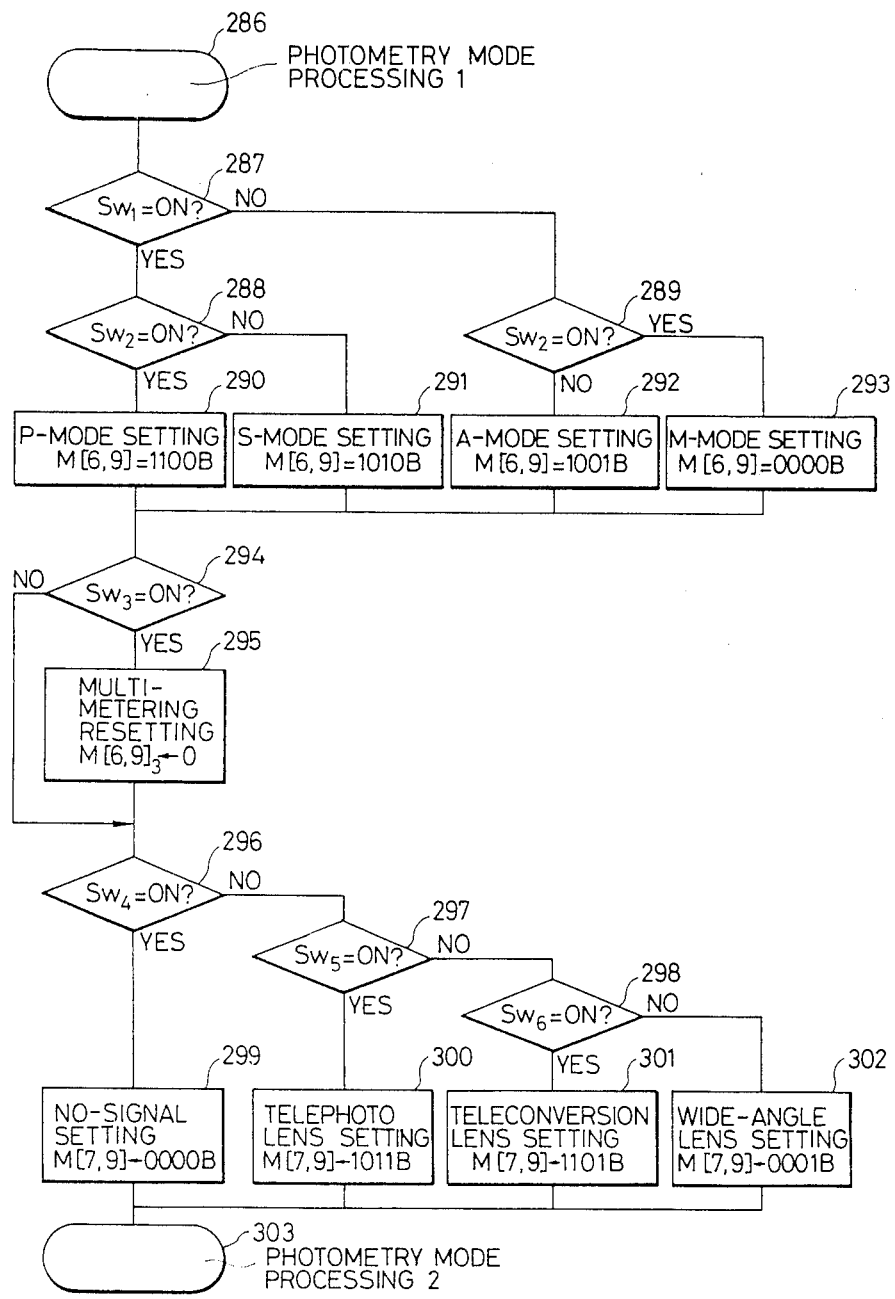
FIG. 24A is a flow chart of part of a metering-mode processing subroutine.
Figure 24B:
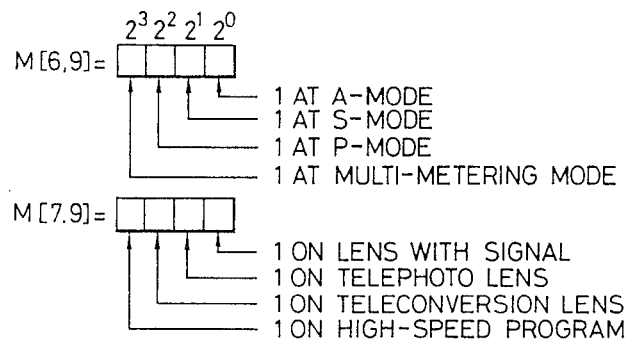
FIG. 24B illustrates bits in memories for indicating information with respect to the kinds of mode and lens.

FIG. 24A shows part of the metering mode processing subroutine shown in FIGS. 20A and 20B. At Steps 287 and 288, the program is in P-mode if both the switches SW$_1$ and SW$_2$ are in their ON state. As a memory storing the information of mode, "1100B" is stored in M[6,7] at Step 290 as shown in FIG. 24B. The digit of $2^3$ shown in FIG. 24B corresponds to the multi-metering flag described with reference to FIG. 6. By making this flag one (1), the multi-metering mode is simultaneously set.

If the switch SW$_1$ is in ON and the switch SW$_2$ is in OFF, the program is in S-mode as shown at Step 291. Therefore, "1010B" is stored in M[6,9]. At Steps 287 and 289, if both the switches SW$_1$ and SW$_2$ are in OFF, the program becomes A-mode so that "1001B" is stored in M[6,9] at Step 292. In any event, the program is set at multi-metering mode. On the other hand, if the switch SW$_1$ is in OFF and the switch SW$_2$ is in ON, the program becomes M-mode such that the multi-metering flag having $2^3$ digit will be made zero to be M[6,9]=0000B so that the central concentration metering mode will be set. This is because it is required that the multi-metering operation processing will not be executed by the camera since the M-mode reflects an operator's intention. At Step 294, the switch SW$_3$ is checked whether it is in ON or OFF. If the switch SW$_3$ is in ON in the central concentration metering mode, M[6,9]$_3$ is made zero to reset the multi-metering mode at Step 295.

If the switch SW$_4$ is in ON at Step 296, this is indicative of a lens having no focal length and belonging to the afore-mentioned groups 1 or 2. Therefore, zero is stored in M[7,9] at Step 299. If the switch SW$_3$ is in OFF, the program is shifted from Step 294 to Step 296.

Figure 38:
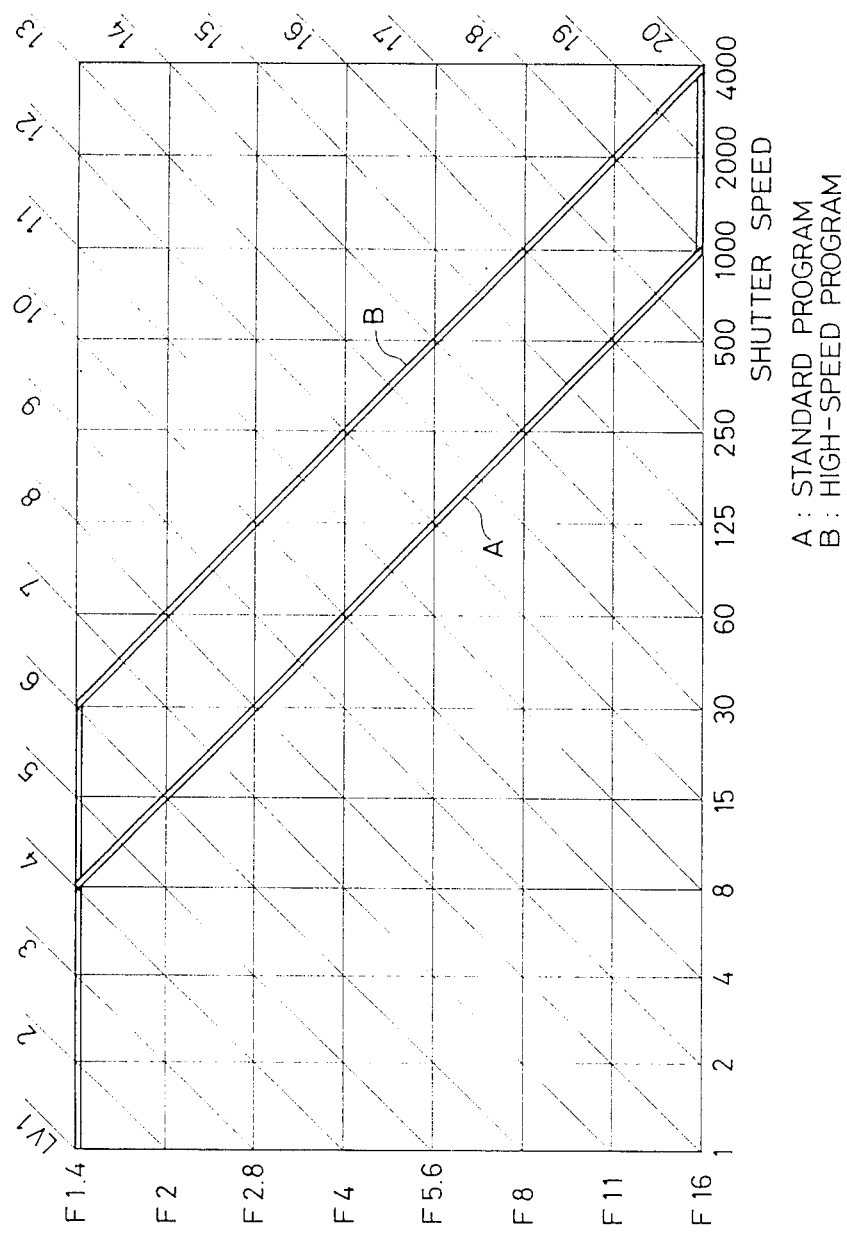
FIG. 38 shows a diagram showing programs in the mode P according to the embodiment of the present invention.

At Steps 297 and 298, the program is executed in accordance with the states of the switches SW$_5$ and SW$_6$ so that the program is separated into telephoto lens, teleconversion lens and wide-angle lens at Steps 300, 301 and 302. The digit of $2^3$ in M[7,9] shown in FIG. 24A intends to set such a high-speed program mode as shown in FIG. 38 depending on the selected program mode.

Figure 25B:
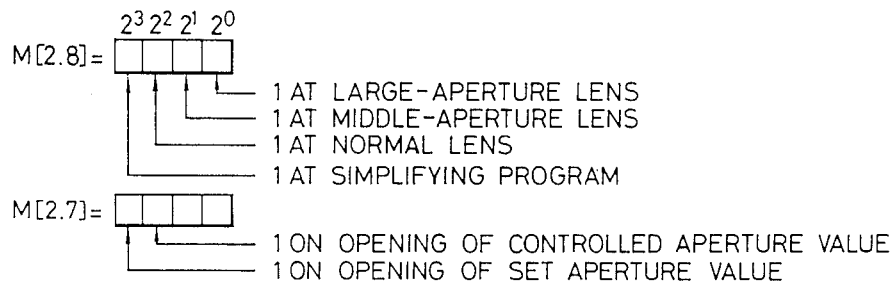
FIG. 25B illustrates bits in memories for storing results from the classification of groups due to openings in the stop and from the discrimination of the openings.
Figure 25A:
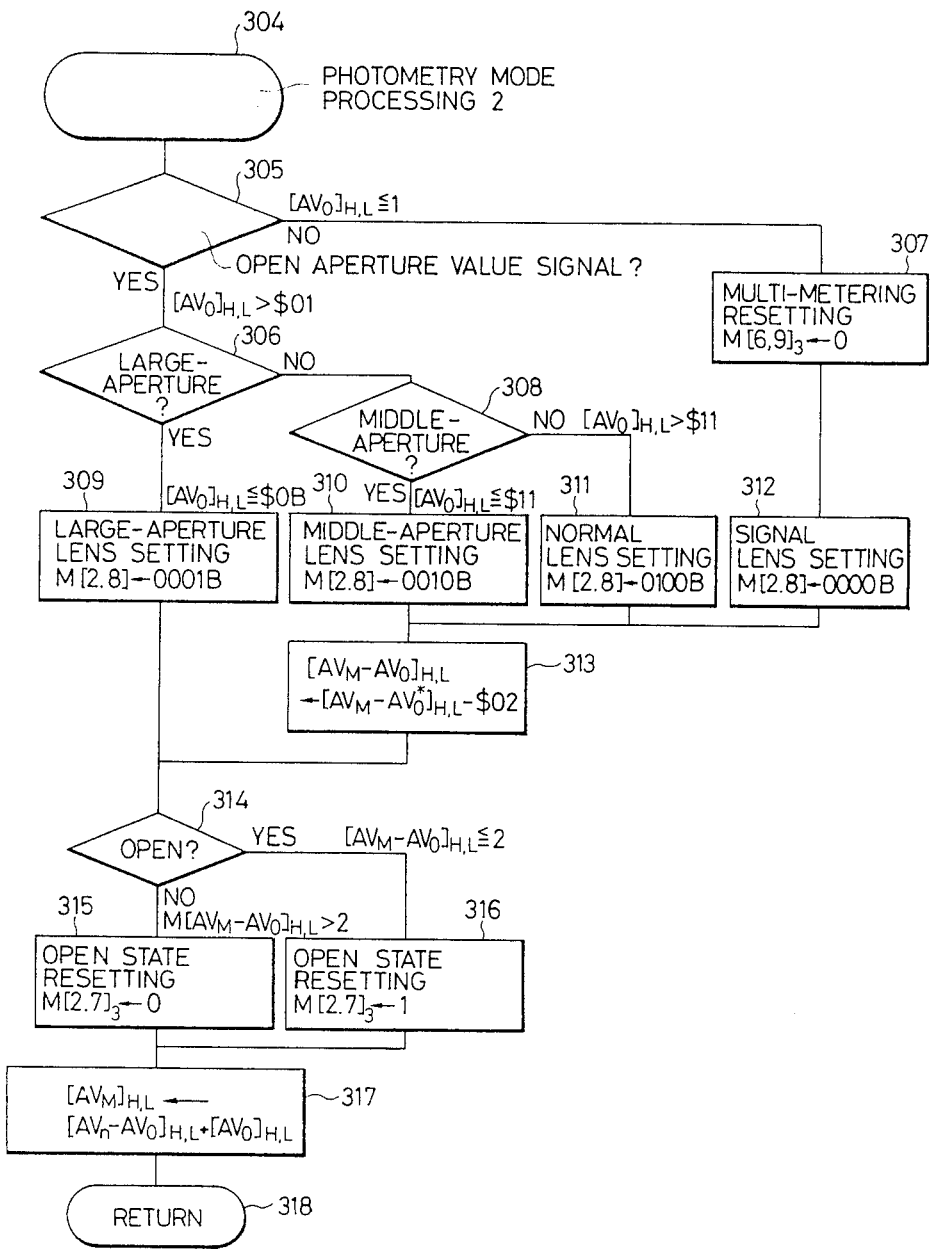
FIG. 25A is a flow chart of the processing portion of the metering-mode processing subroutine which is continuous to FIG. 24.

FIG. 25A shows the continuation of the metering mode subroutine shown in FIG. 24A. At Step 305, open aperture value signals [AV$_0$]$_{H,L}$ in M[6,8] and M[7,8] is indicative of the presence of a lens having no open aperture value signal when the following formula:

$$[AV_0]_{H,L} \leq 1 \quad (20)$$

is satisfied relative to the formula (17) since the above signals [AV$_0$]$_{H,L}$ are 1/6[EV]. At Step 307, M[6,9]$_3$ is made zero to reset the multi-metering mode and at the same time M[2,8] shown in FIG. 25B is cleared to store the fact that that lens belongs to the group 1. Thus, all the conditions (i) to (iii) described with reference to FIG. 5 will be checked during the above process.

Subsequently, at Steps 308, 310 and 311, the following matters:

$$\$01 < [AV_0]_{H,L} \leq \$OB \quad (21);$$

$$\$OB < [AV_0]_{H,L} \leq \$11 \quad (22);$$

and $$\$11 < [AV_0]_{H,L} \quad (23)$$

are judged respectively for the formulas (18), (19) and (16). As a result, results of grouping based on the open aperture value AV are stored in M[2,8] shown in FIG. 25B.

Where a large-aperture lens is used, at Step 306, a deviation of ⅙[EV] shown in FIG. 7 is compensated by subtracting the set stop-down step signal [AV$_M$−AV$_0$*]$_{H,L}$ by $02 corresponding to ⅙[EV] at Step 313.

At Step 314, it is detected by the formula [AV$_M$−AV$_0$]$_{H,L}$≦2 (24) that the set aperture value corresponds to the opening of the stop. Thus, M[2,7]$_3$ shown in FIG. 25B is made one (1). This means the clearing operation at the initial setting. If one (1) is set at the digit of M[2,7]$_2$ when the controlled stop-down step AVs−AV$_0$ is indicative of the opened aperture and when the following formula:

$$M[2,7] \geq 4 \quad (25)$$

is fulfilled, this means that the stop is opened in accordance with either of at least the set value or control value.

Figures 26, 27:
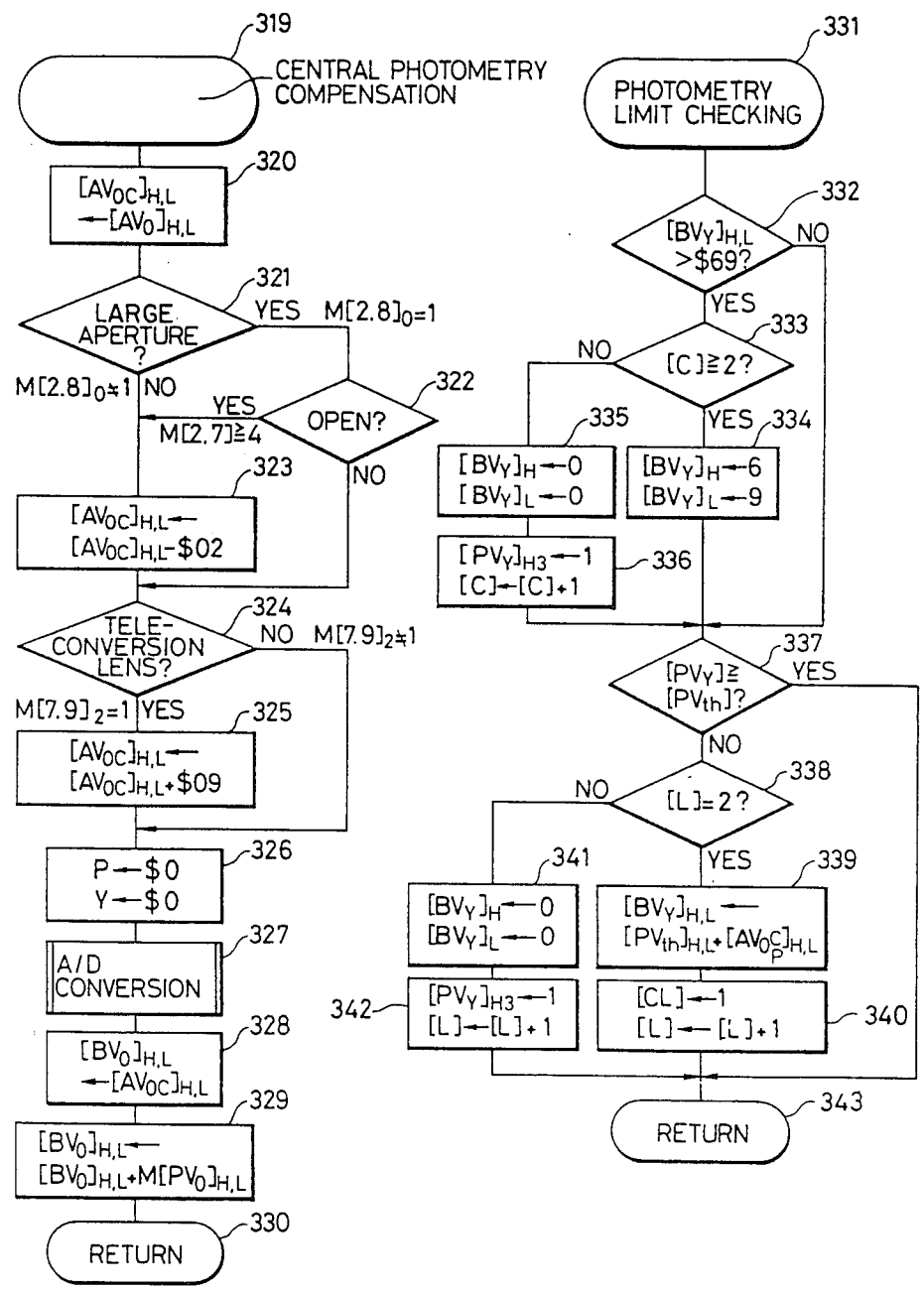
FIG. 26 is a flow chart of subroutines for photometry and compensation with respect to the central section.
FIG. 27 is a flow chart of a photometry limit checking subroutine.

FIG. 26 shows a subroutine for the central section metering and compensating shown in FIG. 20. At Step 320, [AV$_0$]$_{H,L}$ of the M[6,8] and M[7,8] are respectively stored in M[4,8] and M[5,8] to provide an open aperture value [AV$_{0C}$] relative to the central section metering output after compensation, where AV$_{0C}$ is equal to AV$_0$+β$_C$.

If there is M[2,8]$_0$≠1 indicative of no large-aperture lens, at Step 323, a numeral value corresponding ⅙[EV] is subtracted from [AV$_{0C}$] to provide M[2,8]=1. At Step 322, even if a large-aperture lens is used, the formula (25) is fulfilled and also when the stop is opened under the same condition, at Step 323, the similar subtraction of ⅙[EV] is executed relative to [AV$_{0C}$]. At Step 324, the presence or absence of a teleconversion lens is checked. If a teleconversion lens is used at M[7,9]$_2$=1, at Step 325, a numeral value corresponding to 1½ is added to [AV$_{0C}$]. At Step 326, zero is outputted at the P-port of the MCU 222 so that Y will be set at zero. At the same time, the output of the photometry circuit 200 is subjected to A/D conversion with the result being stored at M[6,0] and M[7,0] at Step 327. These resulting values [BV$_0$]$_{H,L}$ and [AV$_{0C}$]$_{H,L}$ are added to each other with the result being stored in M[4,0] and M[5,0]. Thus, brightness value [BV$_0$]$_{H,L}$ in the central field section Z will be stored in M[4,0] and M[5,0].

FIG. 27 shows a subroutine for photometry limit checking which will be described hereinafter. Herein, BV$_0$–BV$_4$ shown in Table 3 are first compared, at Step 332, with the following matter:

$$BV_Y > 11\tfrac{1}{2}(Y = 0,1,2, \ldots 4) \quad (26)$$

where 11½ corresponds to $69. If the formula (26) is fulfilled, Step 335 provides:

$$BV_Y = 0 \ (Y = 0,1, \ldots 4) \quad (27)$$

Figure 28:
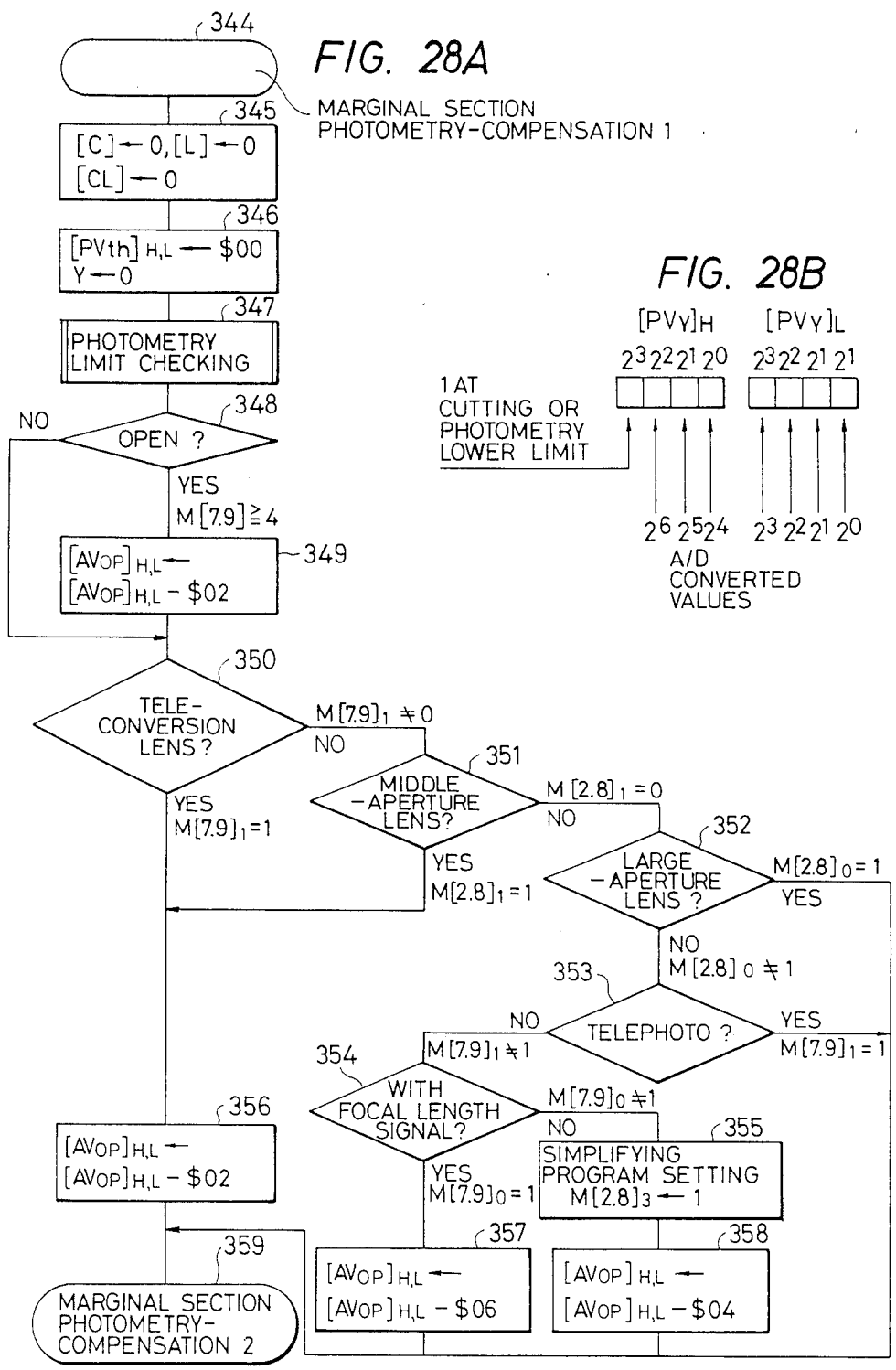
FIG. 28A is a flow chart of a portion of a marginal photometry and compensation subroutine, that portion being adapted to process the information of the central section and the compensation of stop openings.
FIG. 28B illustrates bits of a memory.

PV$_0$–PV$_4$, that is, [PV$_Y$]$_{H3}$ is empty after 7 bits have been subjected to A/D conversion as shown in FIG. 28B. In this connection, Hn (n=0,1,2,3) represents the digit of $2^n$ in the upper rank 4 bits while Ln (n=0,1,2,3) denotes the digit of $2^n$ in the lower rank 4 bits. This empty bit is used as a flag when the metering output is cut. At Step 336, one (1) is set at [PV$_Y$]$_{H3}$ and at the same time the number of cuts [C] (the number of marginal field sections Z$_0$, Z$_1$, Z$_2$, Z$_3$ or Z$_4$ not metering and processed) is incremented by one (1). Prior to this, if the number of cuts is equal to zero, the increment is one. If the number of cuts is equal to two, the increment is two.

At Step 333, when $$[C] \geq 2 \tag{28},$$

the following relationship is fulfilled:

$$BV_Y = 11\tfrac{1}{2} \tag{29}.$$

Since such a scene that the formula (26) is satisfied is one including a violent light from the sun, this must be neglected. For such a purpose, any marginal field section including the above violent light from the sun should be cut in processing. However, if the number of cuts (C) is increased, such a neglect cannot be continued so that the metering outputs including those to be cut will be processed. This is limited by the formula (29).

On the contrary, for lower brightness, the metering outputs are compared with the photometry limit threshold $PV_{th}$ at Step 337. At Steps 341 and 342, the metering sections are cut when $$PV < PV_{th} \tag{30},$$

as in the formula (27). At the same time, one (1) is set at $[PV_Y]_{H3}$ to indicate the cutting and [L] indicative of the number of cuts by the lower limit of photometry is incremented by one (1).

On the other hand, when the number of cuts [L] on the lower brightness at Step 338

$$[L] = 2 \tag{31},$$

Step 339 provides:

$$[BV_Y] = [PV_{th}] + [AV_{0P}]$$

or $$[BV_Y] = [PV_{th}] + [AV_{0C}] \tag{32},$$

where $AV_{0P}$ is equal to $AV_0 + \beta_P$. Similarly, information lower than the photometry limit may be neglected. However, if such neglect exceeds a predetermined reasonable value, it cannot be neglected. Therefore, it is processed as photometry lower limit threshold $PV_{th}$. Thereafter, at Step 340, one (1) is set in such a memory [CL] indicative of the processing in accordance with the formula (32) and at the same time the number of cuts [L] based on the photometry lower limit is incremented by one (1). When [L] becomes equal to three, such a process will not be executed.

FIG. 28A shows a flow chart relating to the marginal section photometry and compensation shown in FIG. 20A, This flow chart portion may be jumped when the bit of $M[6,9]_3$ corresponding to the multi-metering flag as shown in the flow chart of FIG. 20A is 1 or 0.

When the conditions (i) to (iii) with respect to the central concentration photometry are fulfilled, $M[6,9]_3$ is equal to one (1) so that the subroutine shown in FIG. 28A is executed. Prior to this step, the central field section has been metered. Therefore, the photometry limit must be checked in accordance with the photometry limit checking subroutine. At the central concentration metering mode, the brightness value in the central field section may not be cut. However, this processing can be executed since the multi-metering mode has been selected.

In a pre-processing operation, metering sections are cut when the formulas (26) and (30) are satisfied. At Step 345, memories [L] and [C] shown in Table 3 for counting the number of metering sections to be cut are cleared. At the same time, memory [CL] for indicating completion of the process of the formula (32) also is cleared. Thereafter, at Step 346, a value $00 which corresponds to the photometry lower limit for the central field section is stored at a memory $[PV_{th}]_{H,L}$ for storing the photometry lower limit. Thereafter, the photometry limit checking mode described with FIG. 27 is executed at Step 347. Next, open aperture value relative to the marginal section metering outputs is compensated. Namely, at this Step, the open aperture value $[AV_{0C}]_{H,L}$ compensated relative to the central section metering output are stored at M[4,8] and M[5,8] in which these aperture values $[AV_{0C}]_{H,L}$ are processed as open aperture value $[AV_{0P}]_{H,L}$ to compensate the marginal section metering outputs so that the compensation of the open aperture value $[AV_{0P}]_{H,L}$ will be determined. At this point, the central section metering output has already been compensated. Therefore, only the compensation shown in FIG. 9 may be executed. At Step 348, first, M[7,9] becomes larger than or equal to four. If the stop is opened, at Step 349, value ($02) corresponding to $\tfrac{1}{3}[EV]$ is subjected to subtraction. At Step 350, $M[7,9]_1$ becomes equal to one (1). Irrespectively of the teleconversion lens, at Step 351, $M[2,8]_1$ becomes equal to one (1). On the middle-aperture lens, at Step 356, value ($02) corresponding to $\tfrac{1}{3}[EV]$ is subjected to subtraction. If a lens other than the teleconversion and middle-aperture lenses, at Step 352, $M[7,8]_0$ becomes equal to one (1). In case of the large-aperture lens, no subtraction is executed. The program proceeds to the next Step 359. On the other hand, at Step 353, it is judged that since the lens is not a middle-aperture nor large-aperture lens, it belongs to the normal lens group. Thus, $M[7,9]_1$ becomes equal to one (1). If the lens is a telephoto lens, no processing is executed and then the program proceeds to the next Step 359. If the lens is not a telephoto lens, it is checked by the use of the bits of $M[7,9]_0$ at Step 354 whether or not there is a focal length signal. $M[7,9]_0$ becomes equal to one (1). If there is a focal length signal, it is judged that this lens is a wide-angle lens. At Step 357, value ($06) corresponding to 1[EV] is subjected to substraction. On the contrary, if $M[7,9]_0$ does not become one (1) and there is no focal length signal, the bit of $M[2,8]_3$ is set one (1) at Step 355. The program is changed to the simplifying program mode. At Step 358, value ($04) corresponding to $\tfrac{2}{3}[EV]$ is subjected to subtraction.

Thus, the compensation of the open aperture value relative to the marginal section metering outputs described in connection with FIG. 12 is completed.

Figure 29:
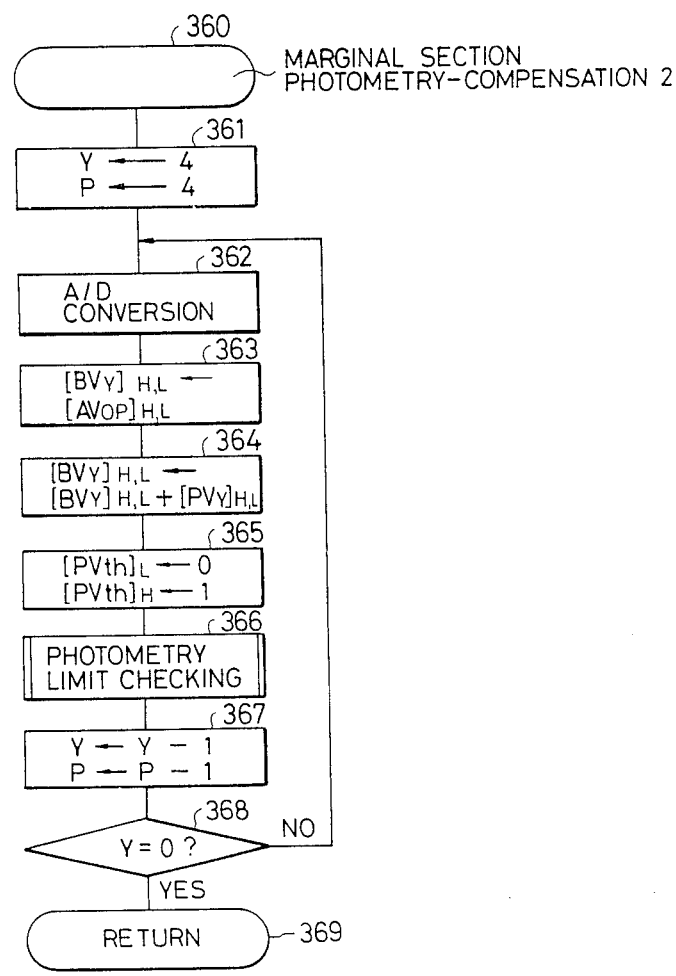
FIG. 29 is a flow chart of a portion of the subroutine which is continuous to FIG. 28.

FIG. 29 shows a portion of the marginal section metering and compensating subroutine which relates to the marginal section photometry. At Step 361, four (4) is set at the Y register and P-port. At Step 362, A/D conversion subroutine is executed such that metering output $[PV_4]_{H,L}$ corresponding to the right and lower portion $Z_4$ of the field to be photographed is stored at M[6,4] and M[7,4]. Subsequently, the process similar to that of the central field section $Z_0$ is repeated. In other words, at Step 363, $[AV_{0P}]_{H,L}$ is stored at M[4,Y] and M[5,Y] storing $[BV_Y]_{H,L}$ (Y=1-4). At Step 364, this value is added to $[PV_Y]_{H,L}$ with the result being stored at M[4,Y] and M[5,Y]. Next $10 is stored at $[PV_{th}]_{H,L}$ as a photometry lower limit value of the marginal section metering outputs, at Step 365. This photometry lower limit value is different from that of the central field section since the former is decreased in amount of light due to vignetting and others. Subsequently, the photometry limit checking subroutine is executed at Step 366 and then the process metering one of the metering field sections is completed. At Step 367, Y register and P mode register are subtracted each by one. This is repeated until these registers become zero. In such a manner, brightness values of $[BV_4]$ to $[BV_1]$ can be obtained.

Figure 30:
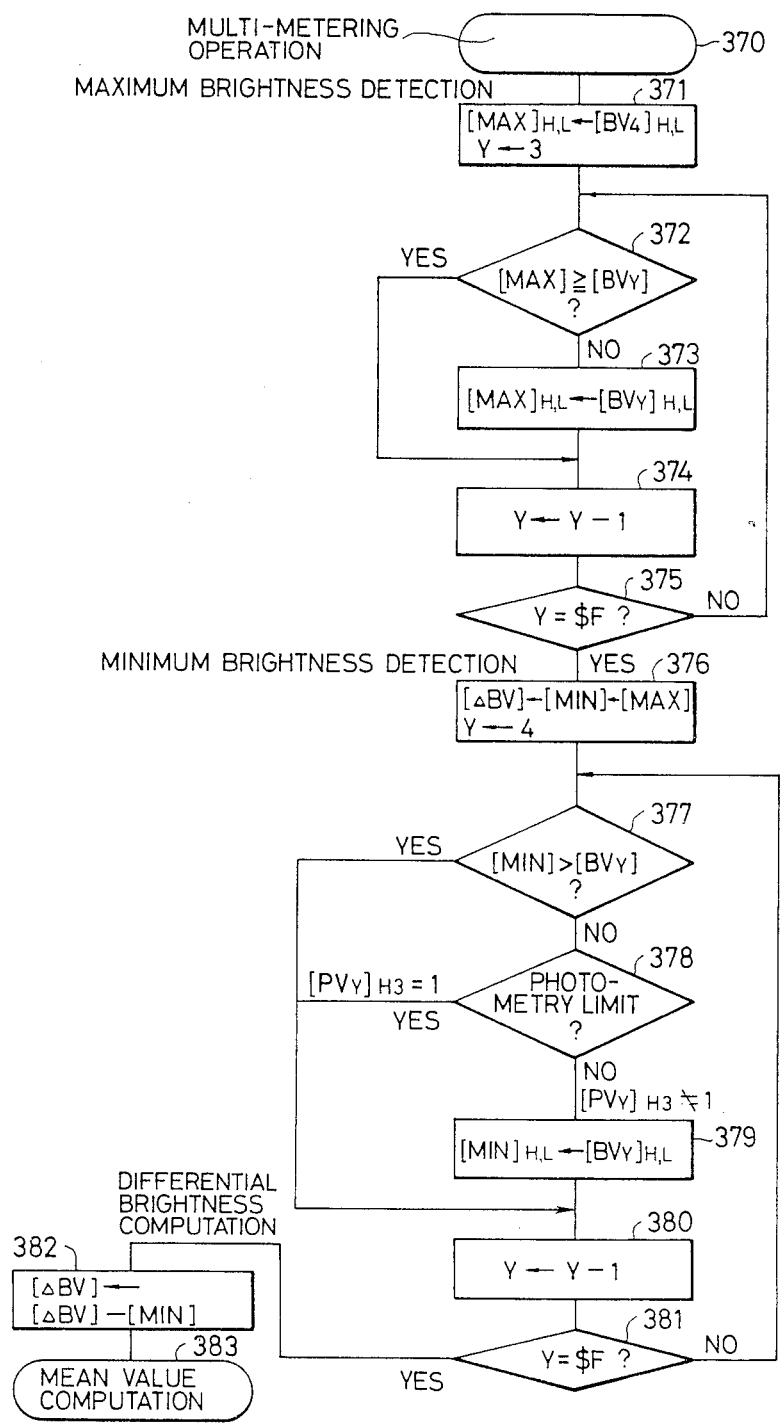

In FIG. 30, the multi-metering operation subroutine shown in FIG. 20 begins. This subroutine is used to carry out detection of maximum brightness value $BV_{max}$ and minimum brightness value $BV_{min}$ and computation of differential brightness $\Delta BV$. First of all, the maximum value is detected. For this purpose, memories $[MAX]_{H,L}$ (= M 4,A], M[5,A]) shown in Table 3 is used. At Step 371, the anticipated maximum value $[BV_4]$ is stored in [MAX] to make Y register three (3). At Step 372, $[BV_3]$ is compared with [MAX]. If $BV_3$ is larger than [MAX], it is stored to [MAX] at Step 373. Subsequently, Y register is subtracted by one (1) at Step 374. Similar comparison of $[BV_Y]$ is executed until Y=$F at Step 375. Thus, the maximum value of $[BV_4]$ to $[BV_0]$ will remain in [MAX]. In such a manner, the maximum brightness value can be detected. Minimum brightness value can be detected by the reverse of the above process. At Step 376, the value of [MAX] is stored, as an anticipated minimum brightness value, in $[MIN]_{H,L}$ (=M[4,B], M[5,B]) used as a memory for minimum brightness value. At the same time, [MAX] is stored in a memory [$\Delta BV$] (=M[4,C], M[4,B] for storing differential brightness. Y register is placed on four (4). At Step 377, [MIN] begins to be compared with $[BV_4]$. If $[BV_4]$ is smaller than [MIN], at Step 378, it is checked whether or not the field section $Z_4$ corresponding to $[BV_4]$ is cut by reaching its photometry limit or other reason. If $[PV_Y]_{H3}$ is equal to one (1), the presence of the cut field section is confirmed and it is then judged that $[BV_4]$ is not minimum brightness value. If $[PV_Y]_{H3}$ is equal to zero, $[BV_4]$ is stored in [MIN] as minimum brightness value at Step 379. Thereafter, at Step 381, Y register is subtracted by one (1) and this is repeated until it becomes $F. In this manner, the respective $[BV_3]$-$[BV_0]$ are compared with [MIN] until minimum brightness value $BV_{min}$ of the five metering field sections is stored in [MIN]. Since [MAX] value has already been stored in [$\Delta BV$], the following operation:

$$\Delta BV = BV_{max} - BV_{min} \quad (33)$$

is executed by decreasing [MIN] at Step 382 to obtain a differential brightness which is in turn stored at M[4,C] and M[5,C].

Figure 31:
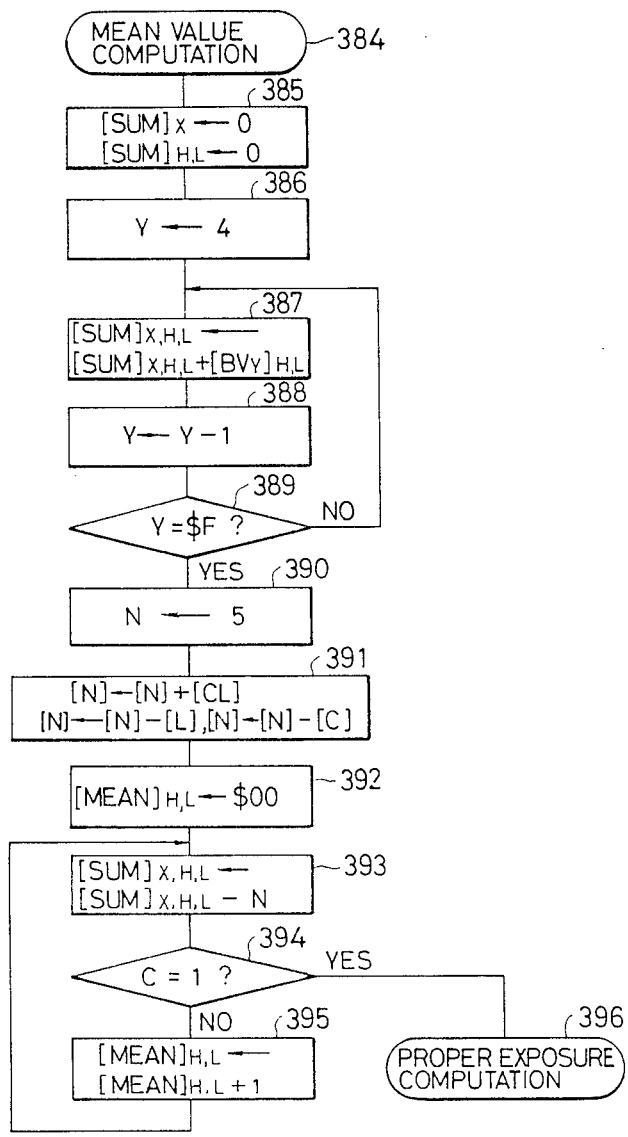

FIG. 31 shows a subroutine for determining the mean brightness value $BV_{mean}$ of the five brightness values $BV_0$-$BV_4$. First of all, the five brightness values are summed. To provide a memory for storing the summed brightness value, $[SUM]_{X,H,L}$ (=M[3,7], M[4,7] and M[5,7]) is first cleared at Step 385. At Step 386, four (4) is set at Y register. At Step 387, the brightness value $BV_4$ is added to [SUM]. By subtracting Y register by one (1) and summing $BV_3$, $BV_2$, $BV_1$ and $BV_0$, that is, until $F is provided as shown at Step 389, the summed value remains in [SUM]. [BV] is 8 bits maximum. Since $[SUM]_{X,H,L}$ has the memory capacity of 12 bits, no overflow will be produced.

Next, to determine the mean value, a divisor is required. Since the apparatus of the present invention executes cutting of metering outputs from metering field sections having high and low brightnesses, the number of effective metering field sections is smaller than five (5). At Step 390, to provide a memory for storing the divisor, five (5) is set at [N] (=M[0,9]) and at Step 391 this is added to the output of a memory [CL] indicative of that [N]has been processed in accordance with the formula (32). Then, the output of [L] storing the number of metering sections lower than the photometry limit is decreased. If the formula (30) is fulfilled to effect the cutting to the metering sections lower than the photometry limit, the effective number (the number of metering outputs not cut) remains in [N]. On the other hand, [N] is subtracted by the number of cuts (C) to metering outputs which exceed a predetermined value, so that effective number when the formula (26) is satisfied and high-brightness metering outputs are cut remains in [N]. Since both the formulas (26) and (30) will not simultaneously be fulfilled, either of the result from the cuttings may be stored. If both the above conditions are not satisfied, the number of effective metering field sections remains five (5).

Next, the summed value stored in $[SUM]_{X,H,L}$ is divided by the number of effective metering sections stored in [N]. At Step 392, a memory $[MEAN]_{H,L}$(=M[4,9], M[5,9]) for storing the mean value is cleared. At Step 393, 12 bits of $[SUM]_{X,H,L}$ is subtracted by 4 bits of [N]. More particularly, a carry flag C is used in subtraction to determine:

$$C \leftarrow 0$$

$$C,[SUM]_L \leftarrow [SUM]_L - [N] - 0$$

$$C,[SUM]_H \leftarrow [SUM]_H - 0 - C$$

$$C,[SUM]_X \leftarrow [SUM]_X - 0 - C.$$

When the last carry flag becomes zero, that is, when $[SUM]_{X,H,L}$ becomes positive, that indicates that $[SUM]_{X,H,L}$ includes one stored in [N]. Thus, at Step 395, one (1) is added to [MEAN]. Subsequently, the subtraction of [N] is repeated until the carry flag becomes one (1) and consequently $[SUM]_{X,H,L}$ becomes negative as shown at Step 394. At this time, the division is completed. Mean value $BV_{mean}$ of five brightness values remains in [MEAN].

Figure 33B:
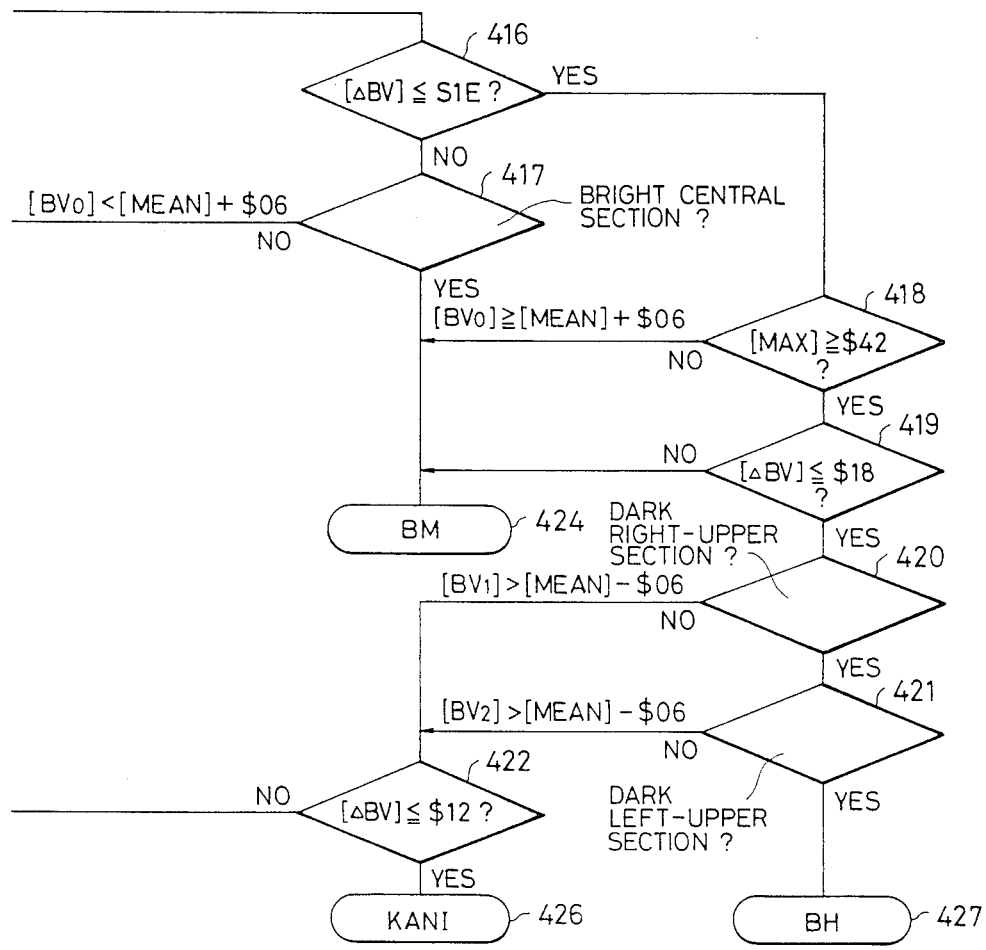

FIGS. 32 and 33 show a portion for discriminating a proper exposure computing subroutine executed after the carry flag has become equal to one (1) as shown in FIG. 31. First of all, the number of cuttings stored in [C] when the formula (26) is fulfilled is checked.

When at Step 398 the formula (26) is fulfilled and the following condition with the number of cut metering sections [C]:

$$[C] \geq 1 \quad (34)$$

is satisfied, it is checked whether or not it is larger than 2.

When at Step 399 the formula (26) is fulfilled and the number of cut metering sections [C] is $$[C] \geq 2 \quad (35),$$

the program jumps to BM (Step 396) for controlling exposure relative to the mean brightness value in the object. This is carried out because although the control should be effected on the side of low brightness when a scene to be photographed receives sunlight to provide high brightness increasing the number of metering sections to be cut, it is restricted by the upper limit determined by the formula (29). The mean brightness value is preferable since it provides an exposure value near the low brightness value. If the formula (34) is fulfilled and the formula (35) is not satisfied, that is, when the formula (26) is fulfilled and the number of cut metering sections [C] is $$[C] = 1 \qquad (36),$$

it is judged at Step 395 whether the program should be jumped to BM or BL, depending on the differential brightness [$\Delta BV$].

When the formula (36) is fulfilled and if the following conditions are satisfied:

$$[\Delta BV] \leq \$18 \qquad (37),$$

and then $$\Delta BV \leq 4 [EV] \qquad (37')$$

by comparing the differential brightness BV with $18 corresponding to 4[EV], the program may be jumped to BL to provide an exposure value near the low brightness where a metering section irradiated indirectly by sunlight has a high brightness higher than the upper limit and yet where the entire section has lower brightness level than when the formula (35) is fulfilled.

On the other hand, if both the formula (35) and (37) are not fulfilled, that is, when the formula (36) is satisfied and the differential brightness is $$\Delta BV > \$18 \text{ (corresponding to 4[EV])} \qquad (38),$$

this differential brightness is too high. Therefore, the program is jumped to BM to select a mean brightness value as in the formula (35). If the formula (34) is not fulfilled, memory [L] is compared with one (1) at Step 397. If the formula (30) is satisfied and the number of cut metering sections [L] is $$[L]0]1 \qquad (39),$$

the mean brightness value becomes too high since there are metering sections located below the photometry lower limit and cut not to contribute computation of mean brightness. To control the exposure relative to low brightness, therefore, the program is jumped to BL. The description from FIG. 30 to the just mentioned jump of the program corresponds to the pre-processing program described with reference to FIG. 16. Next, at Step 399, it is checked whether or not the simplifying program should be executed. Memory $M[2,8]_3$ includes, at its $2^3$ bits, information used to determine whether or not the multi-metering operation should be simplified. If $M[2,8]_3 = 1$, the lens used belongs to the aforementioned group 2 (a). Thus, the program proceeds Step 400 at which the simplified process is executed. If $M[2,8]_3 \neq 1$, the program proceeds Step 401 whereat the main process is executed. At Step 401, the differential brightness is compared with value $09 corresponding to 1.5[EV]. If the result is $$[\Delta BV] \leq \$09 \qquad (40)$$

and then $$\Delta BV \leq \tfrac{1}{2} \qquad (40'),$$

it is judged that there is a flat scene. Thus, the program is jumped to CENTER (Step 402) to control exposure based on the central section brightness $BV_0$. On the flat scene, there is any large difference even if any output is selected. It is desirable that a specific metering section is used to control exposure on adjusting a camera relative to a uniform brightness surface when it is manufactured because there is less scatter. Therefore, the program was jumped to CENTER to control exposure based on the most effective brightness value of the central field section. On the other hand, if $M[2,8]_3 = 1$ and when the simplified program is chosen, the differential brightness $\Delta BV$ is compared with $0C corresponding to 2[EV] at Step 400. If $$[\Delta BV] \leq \$0C \qquad (41)$$

and then $$\Delta BV \leq 2 \qquad (41'),$$

the program is jumped to CENTER (Step 402) as in the formula (40). In comparison with the formula (40), the formula (41) mainly utilizes the brightness value of the central field section because this corresponds to the selection of a simplified program in place of the multi-metering operation processing program for such a reason why the mounted lens belongs to the group 2 (b) and then sufficient compensation cannot be carried out with open aperture value relative to the marginal section metering outputs.

When $M[2,8]_3$ is equal to one (1) and if the formula (41) is not fulfilled, a process labelled as "KANI" is executed. First of all, at Step 403, the brightness value $BV_0$ of the central field section $Z_0$ is compared with $[MIN] + \$02$ corresponding to the minimum brightness value $BV_{min} + \tfrac{1}{3}[EV]$. If the following formulas are fulfilled:

$$[BV_0] \leq [MIN] + \$02 \qquad (42)$$

and then $$BV_0 \leq BV_{min} + \tfrac{1}{3} \qquad (42'),$$

it is judged that the brightness value $BV_0$ of the central field section in which the main part of the object is present with higher probability approaches substantially to the minimum brightness value $BV_{min}$. To control exposure near the side of low brightness, therefore, the program is jumped to BL of Step 407. On the other hand, when $M[2,8]_3$ is equal to one (1) and if both the formulas are not fulfilled, at Step 404, the brightness value $BV_0$ of the central field section is compared with $[MAX] - \tfrac{1}{3}$ which corresponds to maximum brightness value $BV_{max} - \tfrac{1}{3}[EV]$. If $$[BV_0] \geq [MAX] - \$02 \qquad (43)$$

and then $$BV_0 \geq BV_{max} - \tfrac{1}{3} \qquad (43'),$$

the brightness value $BV_0$ of the central field section at which the main part of the object is positioned with higher probability is substantially one approaching to maximum brightness value $BV_{max}$. Thus, the program is jumped to BH of Step 405 to control exposure near the side of high brightness. When $M[2,8]_3$ is equal to one (1) and when all the formulas (41)–(43) are not fulfilled, it is judged that there is the general state in the camera. The program is jumped to BM of Step 406 to control a mean exposure. By thus judging the formulas (41) and (42) when the formula (41) is not satisfied, a good result can be obtained in comparison with where the exposure is controlled simply by the use of the brightness value $BV_0$ of the central field section, even if the open aperture value to the marginal section metering outputs cannot sufficiently be compensated. This is because BM represents mean brightness value and BM and BL represent mean value between maximum or minimum brightness value and mean brightness value, so that the obtained brightness value will be equal to the sum of all the measured brightness values.

FIG. 33 shows part of the proper exposure computing subroutine which is one executed when $M[2,8]_3$ shown in FIG. 32 is equal to zero and if the formula (40) is not fulfilled. This subroutine portion is omitted when the simplified program is selected, and corresponds to the processing program A of FIG. 16. In the subroutine of FIG. 33, maximum brightness value $BV_{max}$ in the memory [MAX] is first compared with $5D corresponding to brightness value of $BV9\frac{1}{2}$ at Step 410. If $$[MAX] \geq \$5D \tag{44}$$

and then
$$BV_{max} \geq 9\frac{1}{2} \tag{44'}$$

it is an outdoor scene at fine weather because such an object fulfilling the formula (44) is necessarily one located outdoor on fine day and yet a relatively high reflectivity. If such a scene is photographed with an exposure near the side of low brightness, a good result is obtained. However, if the following conditions are satisfied, the selection of mean value provides a good result. In other words, if $$[\Delta BV] \leq \$18 \tag{45}$$

and then $$\Delta BV \leq 4 \tag{45'},$$

when the differential brightness $\Delta BV$ is compared with $18 corresponding to 4[EV] at Step 412; if $$[BV_0] \geq [MEAN] \tag{46}$$

and then $$BV \geq BV_{mean} \tag{46'},$$

when the brightness value $BV_0$ of the central field section $Z_0$ is compared with mean brightness value $BV_{mean}$ (stored in [MEAN]) at Step 413; and if $$[BV_3] \geq [MEAN] - \$06 \tag{47}$$

and then $$BV_3 \geq BV_{mean} - 1 \tag{47'} \text{ and}$$

$$[BV_4] \geq [MEAN] - \$06 \tag{48}$$

and then $$BV_4 \geq BV_{mean} - 1 \tag{48'},$$

when the brightness values $BV_3$, $BV_4$ of the right, lower and left, lower sections $Z_3$, $Z_4$ are respectively compared with $[MEAN] - \$06$ corresponding to mean brightness value $BV_{mean} - 1[EV]$ at Steps 414 and 415, the program is jumped to BM of Step 425 to control exposure by the use of mean brightness value. At this time, the central field section in which the main portion of the object is present with higher probability is more bright and the ground side in which the main portion of the object is present with less probability is not very dark. It is thus preferred that the exposure is controlled based on the mean brightness value. On the other hand, if either of the formulas (45)–(48) is not fulfilled, the program is jumped to BL to control exposure near the side of low brightness, as described hereinbeforce.

If the formula (44) is not fulfilled, that is, when $$BV_{max} < 9\frac{1}{2} \tag{49},$$

the differential brightness $\Delta BV$ is compared with $1E corresponding to 5[EV] at Step 416. If $$[\Delta BV] \leq \$1E \tag{50}$$

is not staisfied, that is, if $$\Delta BV > 5 \tag{51},$$

the brightness value $BV_0$ of the central field section is compared with $[MEAN] + \$06$ corresponding to mean brightness value $BV_{mean} + 1[EV]$. If $$[BV_0] \geq [MEAN] + \$06 \tag{52}$$

is not fulfilled, that is, if $$BV_0 < BV_{mean} + 1 \tag{53},$$

it means a scene having very high contrast which is judged to be a backlight scene having its central field seciton $Z_0$ which does not have very high field section brightness. Thus, the program is jumped to BL of Step 423 to provide exposure near the side of low brightness. The comparison of the central section brightness value with mean brightness $BV_{mean} + 1[EV]$ is because the brightness of the backlight scene having high contrast is often increased by the more bright background.

Therefore, if the formulas (49), (51) and (52) are fulfilled conversely, this formula (52) is $$BV_0 \geq BV_{mean} + 1 \tag{52'}$$

Attaching importance to that the central field section in which the main portion of the object is present with higher probability is increased in brightness to some extent, accordingly, the program is jumped to BM of Step 424 to control exposure based on mean brightness value such that the exposure is determined near the side of high brightness in comparison with that when the formula (53) is fulfilled.

Next, if the differential brightness $\Delta BV$ fulfills the formula (50) and when the maximum brightness value $BV_{max}$ is compared with $42 corresponding to a brightness value BV5 at Step 418 to satisfy $$[MAX] \geq \$42 \quad (54),$$

that is, when $$\Delta BV \leq 5 \quad (50'),$$

and $$BV_{max} < 5 \quad (55),$$

it means a scene of twilight or indoor which is relatively dark. Thus, the program is jumped to BM of Step 424 to select mean brightness value such that an exposure attaching importance to the entire atmosphere will be provided.

If the formula (54) is fulfilled, the differential brightness $\Delta BV$ is compared with $18 corresponding to 4[EV] at Step 419. As a result, the formulas (49) and (50) are satisfied when the formula (45) is not fulfilled. Thus, $$\begin{cases} 9\tfrac{1}{2} > BV_{max} \geq 5 \text{ and} & (56) \\ 5 \geq \Delta BV > 4. & (57) \end{cases}$$

This means the general outdoor scene having contrast. It is thus desirable that exposure is controlled based on mean brightness value to appropriately balance between the dark and bright portions. Therefore, the program is jumped to BM of Step 424.

If the formulas (49), (50), (54) are fulfilled, the brightness values $BV_1$, $BV_2$ of the right, upper and left, upper sections $Z_1$, $Z_2$ are respectively compared with [MEAN]−$06 lower than mean brightness value $BV_{mean}$ by one step at Steps and 421. If $$[BV_1] \leq [MEAN] - \$06 \quad (58)$$

and $$[BV_2] \leq [MEAN] - \$06 \quad (59),$$

the right, upper and left, upper field sections are dark. Namely, if $$\begin{cases} 9\tfrac{1}{2} > BV_{max} \geq 5, & (56) \\ 4 \geq \Delta BV > 1\tfrac{1}{2}, & (60) \\ BV_1 \leq BV_{mean} - 1 \text{ and} & (58') \\ BV_2 \leq BV_{mean} - 1, & (59') \end{cases}$$

it means the general outdoor scene having a slight contrast such that both the right, upper and left, upper field sections are dark. Being different from the typical backlight scene having its upper and bright portion such as the sky, this general outdoor scene is very high bright at the central, right-lower and left-lower sections in which the main portion of the object is present with higher probability. Since a good result can be obtained if an exposure near the side of high brightness, the program is jumped to BH of Step 427.

On the other hand, if the formulas (49), (50), (54) and (45) are fulfilled and also if neither of the formula (58) nor (59) is not satisfied, the differential brightness is compared with $12 at Step 422. If $$[\Delta BV] \leq \$12 \quad (61),$$

is not fulfilled, that is, if $$\begin{cases} 9\tfrac{1}{2} > BV_{max} \geq 5, & (56) \\ 4 \geq \Delta BV > 3, & (61) \\ BV_1 > BV_{mean} - 1 \text{ and} & (62) \\ (\text{or } BV_2 > BV_{mean} - 1) & (63) \end{cases}$$

this means the general outdoor scene having a slightly high contrast, from which the aforementioned condition of BH is removed. The program is jumped to BM of Step 425 to control exposure based on mean brightness value as in the scene having high contrast which has been described hereinbefore.

On the other hand, if the formula (61) is fulfilled, that is, if $$9\tfrac{1}{2} \geq BV_{max} \geq 5 \quad (56),$$

$$3 \geq \Delta BV > 1\tfrac{1}{2} \quad (64),$$

$$BV_1 > BV_{mean} - 1 \quad (62)$$

and $$(BV_2 > BV_{mean} - 1) \quad (63)$$

are entirely fulfilled, the program is jumped to the flow of "KANI" shown in FIG. 32.

Such a scene is the general outdoor scene having a contrast. There are thus provided either of an exposure attaching importance to high brightness (jumped to BH of Step 427), an exposure based on mean brightness value (jumped to BH of Step 425) or an exposure attaching importance to low brightness value, in accordance with the brightness. In this manner, parts of the flow shown in FIG. 32 can be made common. The flow "KANI" shown in FIG. 32 corresponds to the processing program B shown in FIG. 16.

Figure 34:
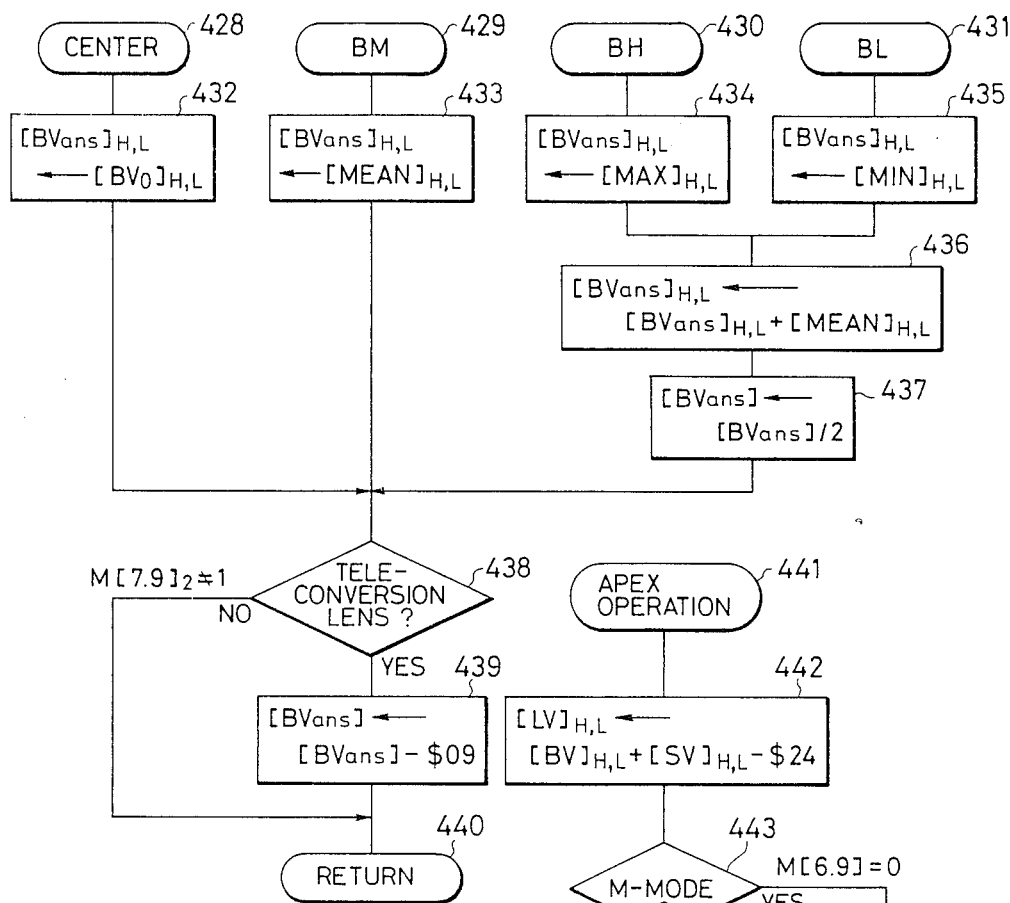

FIG. 34 shows part of the proper exposure computing subroutine which is a flow for computing a proper brightness value discriminated in FIGS. 32 and 33. This corresponds to the selective branch computing means 106 shown in FIG. 14.

To control exposure in accordance with the brightness value $BV_0$ of the central field section, the program is jumped to CENTER of Step 428 and thereafter $[BV_0]$ is transferred to a memory $[BV_{ans}]_{H,L}$ (=M[4,D], M[5,D]) for storing proper brightness value at Step 432. At this time, the proper brightness value $BV_{ans}$ is $$BV_{ans} = BV_0 \quad (65).$$

Next, to control exposure in accordance with mean brightness value, the program is jumped to BM at Step 429 and then [MEAN] corresponding to mean brightness value $BV_{mean}$ is transferred to $[BV_{ans}]_{H,L}$ at Step 433. Thus, the proper brightness value is $$BV_{ans} = BV_{means} \quad (66).$$

To provide an exposure attaching importance to high brightness, the program is jumped to BH at Step 430 and then [MAX] corresponding to maximum brightness value $BV_{max}$ at Step 434 is transferred to [$BV_{ans}$]. At Step 436, this is added to [MEAN] corresponding to mean brightness value $BV_{mean}$:

$$[BV_{ans}]_{H,L} \leftarrow [BV_{ans}]_{H,L} + [MEAN]_{H,L} \qquad (67).$$

At Step 437, the carry flag C is made zero relative to [MEAN]$_H$ and [MEAN]$_L$ so that an ROR operation ($C \rightarrow 2^3, 2^3 \rightarrow 2^2, 2^1 \rightarrow 2^0, 2^0 \rightarrow 0$) will be carried out to provide ½ times. Thus, $$BV_{ans} = (BV_{max} + BV_{mean})/2 \qquad (68).$$

On the contrary, to provide an exposure attaching importance to low brightness, the program is jumped to BL of Step 431 and then at Step 435, [MIN] corresponding to minimum brightness value $BV_{min}$ is first transferred to [$BV_{ans}$] so that the processing operations according to the formula (67) and following formulas are carried out as in case of BH. Accordingly, $$BV_{ans} = (BV_{min} + BV_{mean})/2 \qquad (69).$$

During the above process, information of the proper brightness value $BV_{ans}$ is stored in [$BV_{ans}$] along either of the flow. At Step 438, to check whether or not the lens used is a teleconversion lens, $M[7,9]_2$ is investigated. If $M[7,9]_2$ is equal to one (1) as shown in FIG. 24B, it means the presence of a teleconversion lens. At Step 439, therefore, $09 corresponding to 1½[EV] is subtracted from [$BV_{ans}$] corresponding to proper brightness value $BV_{ans}$. The following processing is executed:

$$BV_{ans} \leftarrow BV_{ans} - 1\tfrac{1}{2} \qquad (70).$$

If $M[7,9]_2$ is equal to zero, no processing is carried out. The processing according to the formula (70) corresponds to the detecting and subtracting circuits 53, 51 shown in FIG. 11.

When the central concentration metering mode is initially selected (this corresponds to M-mode), the processing from "CENTER" also is executed. In the process till this, M[4,D], M[5,D] also serves to store brightness value BV when the central concentration metering mode is selected and further to store proper brightness value $BV_{ans}$ when the multi-metering mode is selected. Therefore, in the subsequent exposure controlling and computing process, values $BV_0$ and $BV_{ans}$ stored at M[4,D], M[5,D] is simply referred to BV as a basic brightness value for controlling exposure.

Figure 35:
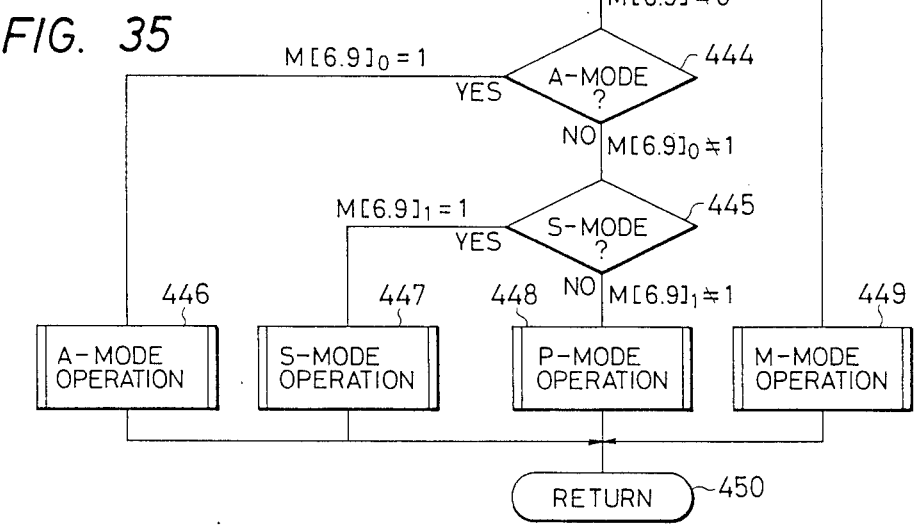
FIG. 35 is a flow chart of an apex operation subroutine.

FIG. 35 shows the flow of the apex operation subroutine shown in FIG. 20. At Step 442, memory [SV]$_{H,L}$ for the apex value SV of film sensitivity shown in Table 3 is transferred to M[4,5], M[5,5], and added by memory [BV] corresponding to the brightness value BV so that M[4,5], M[5,5] become memory [LV] corresponding to LV (Light Value). Namely, $$[LV] \leftarrow [SV] \qquad (71),$$

$$[LV] \leftarrow [LV] + [BV] \qquad (72)$$

and then $$LV = BV + SV \qquad (72').$$

[LV] of the formula (72) must further be compensated on apex operation as will be described below.

Where a uniform brightness is equal to LV12 (when a film of ASA/ISO0100 is used) and if a reference lens, that is, F1.4 lens of 50 mm is metered in the photometry manner, all five metering outputs [$PV_0$]–[$PV_4$] become $48 as shown in Table 2. Since the reference lens is not compensated in open aperture value and its open aperture value $\Delta V_0$ is $06, $$[BV_Y] \leftarrow [PV_Y] + [AV_0] \qquad (73)$$

and $$[BV_Y] = \$48 + \$06 \qquad (74).$$

In the formula (72), if a film used is ASA/ISO100, [SV]=$1E. From the formula (74), $$[LV] = \$4E + \$1E = \$6C \qquad (75).$$

Since the program is in the step of 1/6[EV], $6C corresponds to 18 and then is larger than LV12 by 6[EV]. After computation of the formula (72), therefore, 6[EV] is subtracted by $24 at Step 442:

$$[LV] \leftarrow [LV] - \$24 \qquad (76).$$

Since value "BV $- AV_0$" is not one which is obtained by simply changing "A/S converted value" shown in the same table to 1/6, it is compensated by subtracting $24 from [LV] to make "BV $- AV_0$" corresponding to "A/D converted value". This is shown in FIG. 35 as $$[LV]_{H,L} \leftarrow [BV]_{H,L} + [SV]_{H,L} - \$24.$$

At Step 443, mode now on operation is judged by a memory M[6,9] indicative of mode information to process the respective modes. As shown in FIGS. 24A and 24B, if in M-mode, $M[6,9]_0$–$M[6,9]_3$ become zero, that is, M[6,9]=0. As shown in FIG. 35, M-mode operation routine is thus executed at Step 449.

At Step 444, the number of bits in $M[6,9]_0$ is checked. If it equal to one (1), A-mode operation routine is executed at Step 446.

At Step 445, the number of bits in $M[6,9]_1$ is checked. At Step 447, if it is equal to one (1), S-mode operation routine is executed.

On the contrary, if $M[6,9]_1$ is equal to 0, P-mode operation routine is executed at Step 448.

FIG. 35 shows such a selection of these operation routines.

Figure 36:
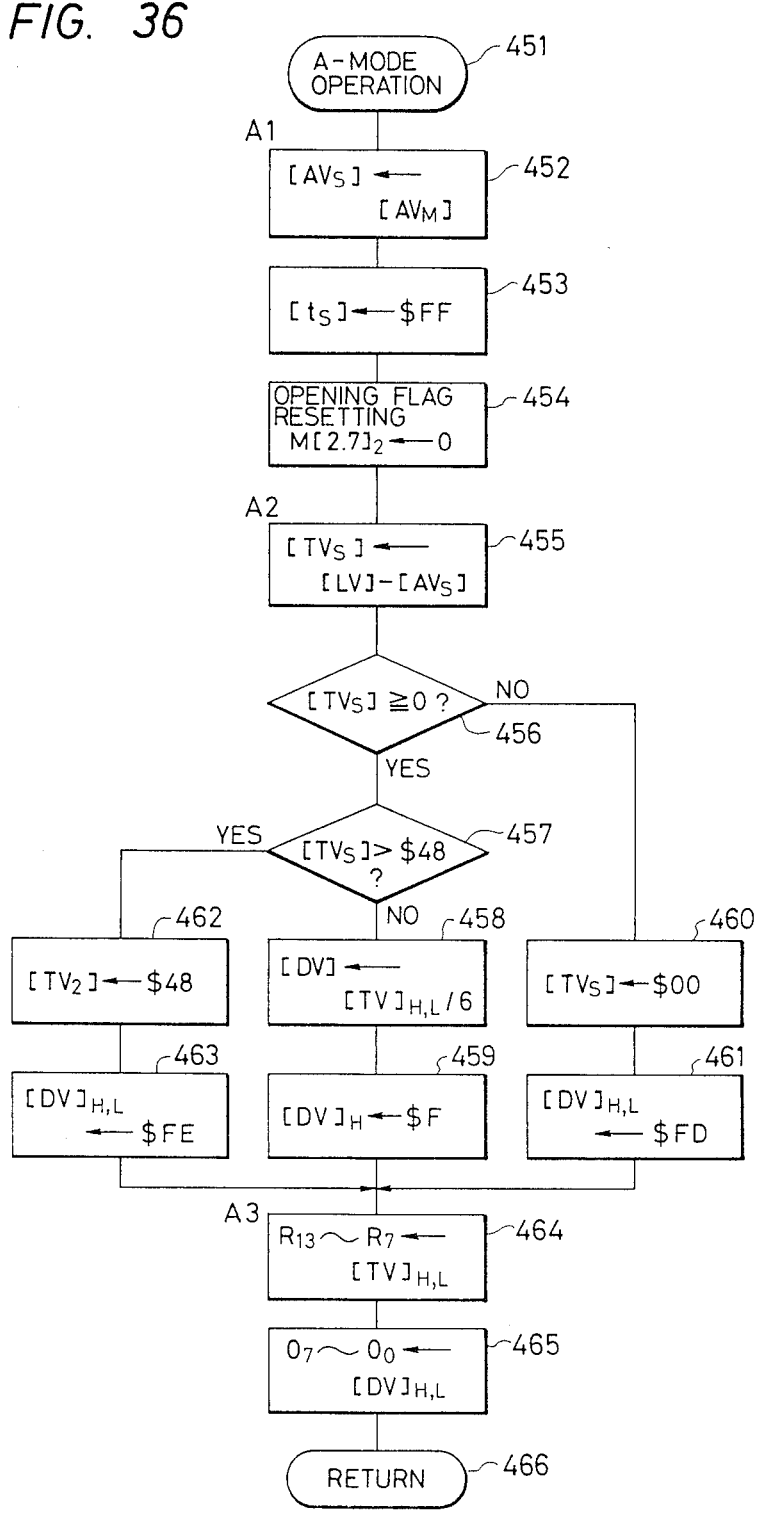
FIG. 36 is a flow chart of an A-mode operation subroutine.

FIG. 36 shows the flow of the A-mode operation routine. The flow portion labelled by "A1" will first be described.

Since controlled aperture value AVs in the A-mode is just identical with set aperture value $AV_V$, [$AV_M$] is at Step 445 transferred to a memory [AVs]$_{H,L}$ (M[4,7], M[5,7]) for storing open aperture values. Since in A-mode, the stop control is mechanically restricted by the stop ring at preset aperture value, $FF is stored in a memory [$t_S$] to provide sufficient time corresponding to $t_S$ shown in FIG. 18 at Step 453. Thus, the opening of the stop is determined only by the preset aperture value through the stop ring so that the controlled aperture value will electrically be controlled. At Step 454, $M[2,7]_2$ which is a flag indicative of the opening of the stop is reset because the compensation of open aperture value (more particularly, operation of $\beta_C$ $\beta_p$) may wrongly be judged during the process of open aperture value computation where $M[2,7]_2$ is set at one (1) in P-mode or S-mode prior to change to A-mode.

The flow portion labelled by "A2" will be described below.

First of all, [TVs] (=M[4,6], M[5,6]) is used as a memory for storing controlled shutter speed value TVs, at Step 455. Information of the memory [LV] is transferred to the memory [TVs] so that the operation of [AVs] will be subjected to subtraction. Therefore, the controlled shutter speed value TVs is stored in the memory [AVs]. At Step 456, [TVs] is compared with $100 corresponding to a shutter speed equal to one second. If $$[TVs] \geq \$600 \tag{77}$$

is not fulfilled, this means that the shutter speed is less than the range of shutter speed. At Step 460, therefore, [TVs] $00 corresponding to lower speed limit second time is stored in [TVs] and at the same time, at Step 461, $FD is stored in a memory $[DV]_{H,L}$ for storing display output DV (Display value) to display a warning indication "L口" indicative of the deviation from the low operating range. Thus, the program is jumped to the flow portion labelled by "A3".

On the other hand, if the formula (77) is fulfilled, at Step 457, [TVs] is compared with $48 corresponding to a high-speed limit second time, for example, 1/4000 seconds. If $$[TVs] > \$48 \tag{78}$$

$48 is stored in [TVs] at Step 462 so that the camera can be controlled by the high speed limit second time. At Step 463, simultaneously, $FE is stored in memory $[DV]_{H,L}$ to display "H l" which represents a warning display indicative of the deviation of high-speed operating range. Then the program is jumped to the flow portion "A3". If the formula (77) is fulfilled but the formula (78) is not satisfied, that is, when $$0 \leq [TVs] \leq \$48 \tag{79}$$

and then $$0 \leq TVs \leq 12 \tag{79'},$$

at Step 458, [TVs] is divided by six (6) and converted into numeral values of 4-bit 0–$c to display "Display" in accordance with shutter speeds TVs to be controlled. This is stored in $[DV]_L$ and at Step 459, $F is stored in $[DV]_H$. The continuation of the program is executed along the flow portion "A3".

As described hereinbefore, the flow portion "A3" is used to provide the outputs of controlled shutter speed TVs and displays to the output ports of the MCU 222.

At Step 464, 7 bits of $[TVs]_{H,L}$ except $2^3$ digit of $[TVs]_H$ are supplied to the terminals $R_{13}$–$R_7$ of the MCU 222. Thus, the camera is controlled by the shutter control circuit 224 in accordance with $TVs]_{H,L}$ after release. Also, at Step 465, $[DV]_{H,L}$ is supplied to the terminals $O_7$–$O_0$ of the O-port to display " l ", " 2 ", "4", ... "2 000", " 4000", "L 口", or "H l ".

Figure 37:
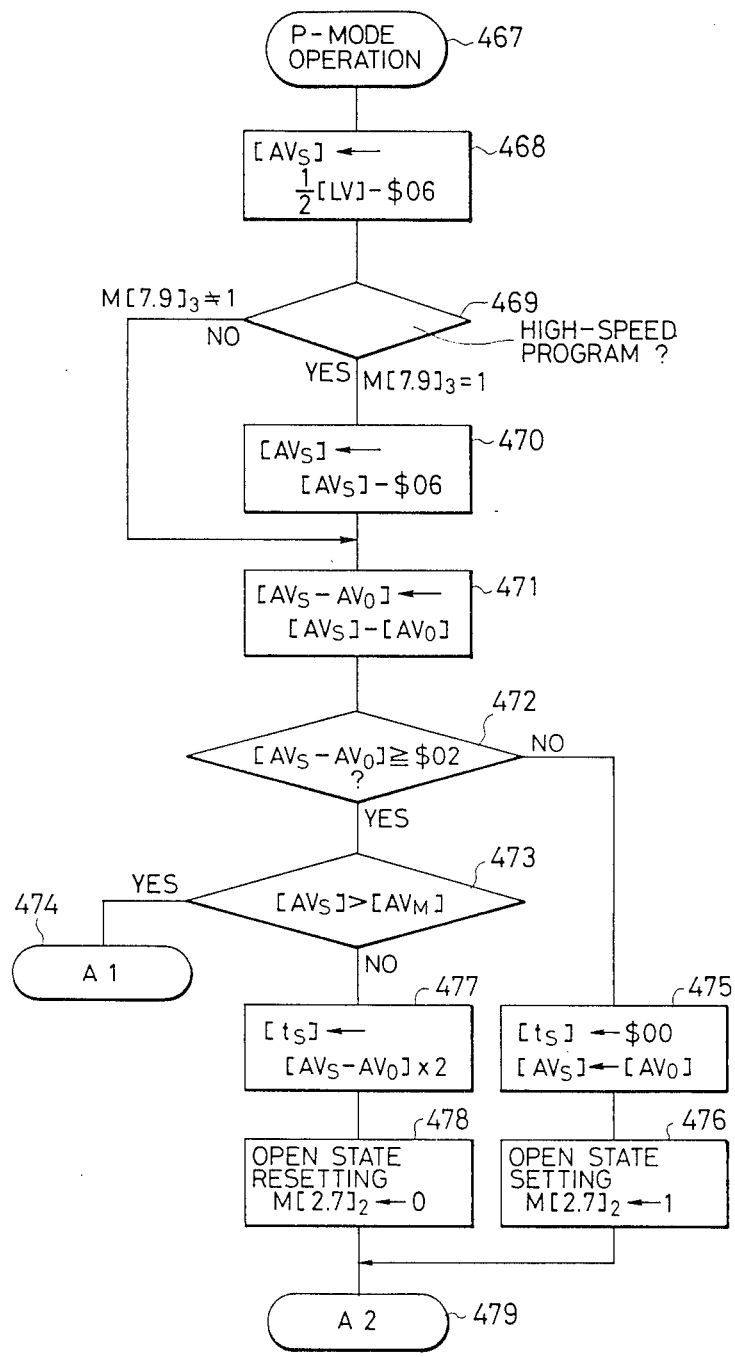
FIG. 37 is a flow chart of an P-mode operation subroutine.

FIG. 37 shows the flow of P-mode operation routine.

First of all, at Step 468, the value of [LV] in which LV has been stored is transferred to a memory [AVs] for storing controlled aperture value AVs. This is multiplied by ½ in accordance with ROR process and then subtracted by $06 corresponding to 1[EV]:

$$[AVs] \leftarrow \tfrac{1}{2}[LV] - \$06 \tag{80}$$

that is, $$AVs = \tfrac{1}{2}LV - 1 \tag{80'}.$$

At Step 469, it is checked by $M[7,9]_3$ whether or not the program is in high-speed program mode. As described with reference to FIGS. 24 A and 24B, $M[7,9]_3$ becomes one (1) when a teleconversion or telephoto lens is mounted in the camera. In such a case, at Step 470, [AVs] is further subtracted by $06 corresponding to 1[EV]:

$$[AVs] \leftarrow [AVs] - \$06 \tag{81}.$$

As a result, $$AVs = \tfrac{1}{2}LV - 2 \tag{82}.$$

On the other hand, if $M[7,9]_3$ is equal to zero, the subtraction is not executed and then the formula (80') is fulfilled. The controlled shutter speed TVs is determined by:

$$TVs = LV - AVs \tag{83}$$

Thus, if the formula (80') is satisfied, $$TVs = LV - (\tfrac{1}{2}LV - 1) = \tfrac{1}{2}LV + 1 \tag{84}.$$

If it is plotted that both the formulas (80') and (84) are fulfilled there is provided the hatched portion of a program diagram (referred to as standard program diagram) as shown by A in FIG. 38.

If the formula (82) is satified and the formula (83) is used in the formula (82), $$TVs = LV - (\tfrac{1}{2}LV - 2) = \tfrac{1}{2}LV + 2 \tag{85}.$$

If the plotting is effected to be satisfied with the formulas (82) and (85) at one time, there is provided the hatched portion of a program diagram (referred to as high-speed program diagram) as shown by B in FIG. 38.

If it is plotted that the formulas (82) and (85) are simultaneously satisfied, there is provided the hatched portion of a program diagram (referred to high-speed program diagram) as shown by B in FIG. 38.

At Step 471, the output of $[AVs]_{H,L}$ is transferred to M[4,E], M[5,E] and subtracted by $[AV_0]_{H,L}$ so that M[4,E], M[5,E] become a memory $[AVs - AV_0]$ corresponding to controlled stop step $(AVs - AV_0)$. This subtraction:

$$[AVs - AV_0] \leftarrow [AVs] - [AV_0] \tag{86}$$

followed by comparison with $02 corresponding to $\tfrac{1}{3}[EV]$ at Step 472. If $$[AVs - AV_0] < \$02 \tag{87},$$

the stop cannot be opened beyond the open aperture value. To control the stop toward its opening, it is desired to cease closing of the stop immediately after it has been initiated as shown in FIG. 18:

$$t_S = 0 \quad (88).$$

For this purpose, at Step 475, there is provided:

$$[t_S] \leftarrow \$00 \quad (88').$$

To set an open aperture value $AV_0$ as the controlled aperture value AVs, there is provided:

$$[AVs] \leftarrow [AV_0] \quad (89).$$

At Step 476, the bit of $M[2,7]_2$ is set at one (1) to indicate the opening of the controlled aperture value. The program is jumped to the flow portion labelled by "A2" at Step 479.

As a result, the camera displays a shutter speed determined in accordance with the corresponding open aperture value and then controlled based on aperture values and shutter speeds shown in the upper part of FIG. 38. Since $M[2,7]_2$ has become one (1), information indicative of the opening of the controlled aperture value is checked during the open aperture value compensating operation process to provide a compensation suitable for that opening. On the other hand, when $$[AVs - AV_0] \geq \$02 \quad (90),$$

at Step 473, it is compared with set aperture value AV. If $$[AVs] > [AV_M] \quad (91),$$

the program is jumped to the flow portion "A2" of FIG. 36 at Step 474. This is just A-mode control by which a shutter speed according to the preset aperture value will be displayed and controlled. This corresponds to the lower part of the program diagram shown in FIG. 38.

If the formula (91) is not fulfilled, at Step 477, the output of the memory $[AVs - AV_0]$ storing the controlled stop step $(Av - AVs)$ is multiplied by two, that is, the carry flag is made zero. $[AVs - AV_0]_H$ and $[AVs - AV_0]_L$ are respectively placed under ROR processing operation ($C \leftarrow 2^3$, $S^3 \leftarrow 2^2$, $2^2 \leftarrow 2^1$, $2^1$, $\leftarrow 2^0$, $2^0 \leftarrow C$). Accordingly, the resulting output is stored in $[t_S]$ which thus provides time corresponding to the controlled stop step $(AVs - AV_0)$. Where the previous photographing condition was in P-mode or S-mode in which the stop is controlled to the side of opening, the memory $M[2,7]_2$ is made zero at Step 478 to reset the camera at its opening state. Thereafter, the program is jumped to the flow portion "A2" at Step 479. In this manner, after release, the stop is controlled to (AVs $-AV_0$) after passage of $(t_1 + t_S)$ from the time $t_1$ at which the closing of the stop is initiated as shown in FIG. 18. As a result, the hatched portions A and B of the program diagram shown in FIG. 38 can be controlled. As aforementioned, the program can be changed from the standard program diagram A to the high-speed program diagram B only when a teleconversion or telephoto lens is mounted in the camera.

Although the present invention has been described as to the determination of $[t_S]$ by $[AVs - AV_0]$ multiplied by two, this coefficient depends on the type of cameras used. In the operation of the formula (82), the same process is carried out when the telephoto and teleconversion lenses are mounted in the camera. In each of such cases, a different shift operation may be utilized. Particularly when a teleconversion lens is mounted in the camera, the high-speed program B shown in FIG. 38 is preferably used since the effective aperture value is increased while the shutter speed is decreased.

As described sometimes previously, FIG. 38 shows the program diagram in P-mode in which the vertical axis represents aperture values while the horizontal axis represents shutter speeds. The standard program A is used when F1.4 lens having its focal length smaller than a predetermined value is preset at F16. On the other hand, the high-speed program B is used when a telephoto lens is mounted in F1.4 lens.

What I claim is:

1. A camera body capable of mounting components including a phototaking lens and conversion means, in which said conversion means can be mounted between said phototaking lens and the camera body, the composite focal length of the conversion means with the phototaking lens being larger than the focal length of the phototaking lens, comprising:
   (a) exposure control means operative to control an amount of exposure and having first and second states at which exposure time is controlled to provide a proper amount of exposure, the exposure time at said second state being shorter than the exposure time at said first state;
   (b) focal length detection means for producing a focal length signal which changes with focal length of said phototaking lens;
   (c) conversion detection means for detecting that said conversion means is mounted on said camera body and producing a detection signal;
   (d) selection means responsive to said focal length signal for causing said exposure control means to select one of said first and said second states; and
   (e) means responsive to said detection signal for causing said exposure control means to be at said second state irrespective of the focal length of the phototaking lens mounted on said camera body.

2. A camera body according to claim 1, wherein said exposure control means has first and second programs each of which determines the exposure time and an aperture value of the phototaking lens in order to provide a proper amount of exposure, and wherein said exposure control means controls the amount of exposure on the basis of said first program at said first state, controls the amount of exposure on the basis of said second programs at said second state, and controls the amount of exposure on the basis of said second program in response to said detection signal.

3. A camera body according to claim 2, wherein said focal length detection means produces said focal length signal which indicates whether the focal length of the phototaking lens is larger than a predetermined value, and wherein said selection means causes said exposure control means to be at said first state when said focal length signal indicates that the focal length of the phototaking lens is not larger than said predetermined value and said selection means causes said exposure control means to be at said second state whe said focal length signal indicates that the focal length of the phototaking lens is larger than said predetermined value.

4. A camera body capable of mounting components including a phototaking lens and conversions means, in which said conversion means can be mounted between said phototaking lens and the camera body, the composite focal length of the conversion means with the phototaking lens being larger than the focal length of the phototaking lens, comprising:
(a) exposure contorl means operative to control an amount of exposure and having first and second states at which exposure time is controlled to provide a proper amount of exposure, the exposure time at said second state being shorter than the exposure time at said first state;
(b) means for detecting that a focal length of said phototaking lens is larger than a predetermined value and producing a focal length signal;
(c) selection means responsive to said focal length signal for causing said exposure control means to select said second state;
(d) conversion detection means for detecting that said conversion means is mounted on said camera body and producing a conversion signal; and
(e) said selection means causing said exposure control means to be at said second state in response to said conversion signal irrespective of the focal length of said phototaking lens.

* * * * *